US012493931B2

(12) United States Patent
Kim

(10) Patent No.: US 12,493,931 B2
(45) Date of Patent: Dec. 9, 2025

(54) NEURAL PROCESSING UNIT AND ARTIFICIAL NEURAL NETWORK SYSTEM FOR IMAGE FUSION

(71) Applicant: DEEPX CO., LTD., Seongnam-si (KR)

(72) Inventor: Lok Won Kim, Seongnam-si (KR)

(73) Assignee: DEEPX CO., LTD., Seongnam-si (KR)

( * ) Notice: Subject to any disclaimer, the term of this patent is extended or adjusted under 35 U.S.C. 154(b) by 0 days.

(21) Appl. No.: 18/021,385

(22) PCT Filed: Nov. 30, 2022

(86) PCT No.: PCT/KR2022/019243
§ 371 (c)(1),
(2) Date: Feb. 14, 2023

(87) PCT Pub. No.: WO2023/106723
PCT Pub. Date: Jun. 15, 2023

(65) Prior Publication Data
US 2024/0265503 A1    Aug. 8, 2024

(30) Foreign Application Priority Data

Dec. 8, 2021 (KR) .................. 10-2021-0174869
Nov. 29, 2022 (KR) .................. 10-2022-0162919

(51) Int. Cl.
*G06T 5/60* (2024.01)
*G06T 3/4046* (2024.01)
(Continued)

(52) U.S. Cl.
CPC .............. *G06T 5/60* (2024.01); *G06T 3/4046* (2013.01); *G06T 3/4053* (2013.01); *G06T 5/50* (2013.01);
(Continued)

(58) Field of Classification Search
CPC ....... G06T 5/60; G06T 3/4046; G06T 3/4053; G06T 5/50; G06T 2200/28;
(Continued)

(56) References Cited

U.S. PATENT DOCUMENTS 11,212,436 B2 * 12/2021 Weng .................... H04N 23/632
11,748,991 B1 *  9/2023 Day ......................... B60Q 3/85
                                                                348/143
(Continued)

FOREIGN PATENT DOCUMENTS

CN        112184547 A     1/2021
CN        112991177 A     6/2021
(Continued)

OTHER PUBLICATIONS

Korean Notice of Allowance dated Mar. 21, 2024 issued on Application No. 10-2022-0162919.
(Continued)

*Primary Examiner* — Kathleen Y Dulaney
(74) *Attorney, Agent, or Firm* — INVENSTONE PATENT, LLC

(57) ABSTRACT

An artificial neural network system for image fusion includes a first sensor that acquires a first image having a first resolution and a first image characteristic; a second sensor that acquires a second image having a second resolution less than the first resolution and a second image characteristic different from the first image characteristic; and a neural processing unit configured to process an image fusion artificial neural network model trained to output a new third image by inputting a first image and a second image having different resolutions and image characteristics. A third image may have a resolution having a value between a resolution of the first image and a resolution of the second image, and a third image may have an image characteristic
(Continued)

that is the same as at least one of an image characteristic of the first image and an image characteristic of the second image.

21 Claims, 27 Drawing Sheets

(51) Int. Cl.
*G06T 3/4053* (2024.01)
*G06T 5/50* (2006.01)

(52) U.S. Cl.
CPC ............... *G06T 2200/28* (2013.01); *G06T 2207/10024* (2013.01); *G06T 2207/10048* (2013.01); *G06T 2207/20081* (2013.01); *G06T 2207/20084* (2013.01); *G06T 2207/20221* (2013.01); *G06T 2207/30201* (2013.01)

(58) Field of Classification Search
CPC . G06T 2207/10024; G06T 2207/10048; G06T 2207/20081; G06T 2207/20084; G06T 2207/20221; G06T 2207/30201; G06T 7/251; G06T 7/70; G06F 17/15; G06F 15/7821; G06N 3/04; G06N 3/063; G06N 3/08; G06N 3/065; G06N 3/0464; G06N 3/0475; G06N 3/048; G06N 3/088; G06N 3/094; H04N 23/00; H04N 23/11; H04N 23/54; H04N 23/951
USPC ........................................ 382/157, 276, 254
See application file for complete search history.

(56) References Cited

U.S. PATENT DOCUMENTS

| | | | | |
|---|---|---|---|---|
| 11,983,853 | B1* | 5/2024 | Zhu | G06T 5/70 |
| 2005/0147292 | A1* | 7/2005 | Huang | G06F 18/254 |
| | | | | 382/218 |
| 2018/0101742 | A1* | 4/2018 | Burge | G06F 16/5838 |
| 2018/0293707 | A1 | 10/2018 | El-Khamy et al. | |
| 2019/0266015 | A1* | 8/2019 | Chandra | G06F 9/4843 |
| 2019/0279009 | A1* | 9/2019 | Srirangam Narashiman | |
| | | | | G06T 7/248 |
| 2020/0143551 | A1* | 5/2020 | Gonzalez Aguirre | G06T 7/174 |
| 2020/0202502 | A1* | 6/2020 | Tsymbalenko | G06T 5/60 |
| 2020/0285959 | A1* | 9/2020 | Liu | G06N 3/048 |
| 2020/0327662 | A1* | 10/2020 | Liu | G06N 3/0475 |
| 2020/0356827 | A1* | 11/2020 | Dinerstein | G06N 3/09 |
| 2021/0308593 | A1* | 10/2021 | Noh | G10L 25/63 |
| 2021/0374190 | A1* | 12/2021 | Shepherd | G06F 16/93 |
| 2021/0400210 | A1* | 12/2021 | Thibault | H04N 23/632 |
| 2022/0214222 | A1* | 7/2022 | Tauber | G01J 5/0205 |
| 2022/0270210 | A1* | 8/2022 | Lee | G06T 3/4046 |
| 2022/0337894 | A1* | 10/2022 | Price | G06T 17/20 |
| 2023/0088801 | A1* | 3/2023 | Lawrence | G06V 10/774 |
| | | | | 348/164 |
| 2023/0245283 | A1* | 8/2023 | Yun | G06T 7/11 |
| | | | | 382/100 |
| 2024/0127364 | A1* | 4/2024 | Zadorozny | G06Q 50/01 |
| 2024/0153157 | A1* | 5/2024 | Xiao | G06T 7/90 |
| 2024/0242309 | A1* | 7/2024 | Shi | G06T 3/4046 |
| 2025/0039560 | A1* | 1/2025 | Martin | H04N 23/45 |

FOREIGN PATENT DOCUMENTS

| | | |
|---|---|---|
| KR | 10-1955498 B1 | 3/2019 |
| KR | 10-1972055 B1 | 4/2019 |
| KR | 10-2019-0118635 A | 10/2019 |
| KR | 10-2019-0119550 A | 10/2019 |
| KR | 10-2047977 B1 | 11/2019 |
| KR | 10-2020-0135102 A | 12/2020 |
| KR | 10-2257752 B1 | 5/2021 |
| KR | 10-2021-0106215 A | 8/2021 |
| KR | 10-2294630 B1 | 8/2021 |
| KR | 10-2021-0128076 A | 10/2021 |

OTHER PUBLICATIONS

A Korean Office Action issued on Aug. 23, 2023 in connection with Korean Patent Application No. 10-2022-0162919 which corresponds to the above-referenced U.S. application.
"Infrared and Visible Image Fusion using a Deep Learning Framework", Dec. 18, 2018, Hui Li et al., p. 2, Fig 1.
"A Survey of Accelerator Architectures for Deep Neural Networks", Jan. 29, 2020, Yiran Chen et al., p. 266, 271.

* cited by examiner

| Layer | Memory Map | | Operating Mode | Data type | ANN DATA LOCALITY | DATA SIZE (Byte) |
|---|---|---|---|---|---|---|
| | Start address | end address | | | | |
| 1 | 0 | A=A' | Read | IFMAP | 1 | A |
| 1 | A'+1 | A+1+B=B' | Read | Kernel | 2 | B |
| 1 | B'+1 | B'+1+C=C' | Write | OFMAP | 3 | C |
| 2 | B'+1 | B'+1+C=C' | Read | IFMAP | 4 | C |
| 2 | C'+1 | C'+1+D=D' | Read | Kernel | 5 | D |
| 2 | D'+1 | D'+1+E=E' | Write | OFMAP | 6 | E |
| 3 | D'+1 | D'+1+E=E' | Read | IFMAP | 7 | E |
| 3 | E'+1 | E'+1+F=F' | Read | Kernel | 8 | F |
| 3 | F'+1 | F'+1+G=G' | Write | OFMAP | 9 | G |
| 4 | F'+1 | F'+1+G=G' | Read | IFMAP | 10 | G |
| 4 | G'+1 | G'+1+H=H' | Read | Kernel | 11 | H |
| 4 | H'+1 | H'+1+I=I' | Write | OFMAP | 12 | I |
| 1 | B'+1 | B'+1+C=C' | Read | SKIP CONNECTION | 13 | C |
| 5 | H'+1 | H'+1+I=I' | Read | Kernel | 14 | I |
| 5 | I'+1 | I'+1+J=J' | Read | IFMAP | 15 | J |
| 5 | J'+1 | J'+1+K=K' | Write | OFMAP | 16 | K |

FIG. 15B

NEURAL PROCESSING UNIT AND ARTIFICIAL NEURAL NETWORK SYSTEM FOR IMAGE FUSION

CROSS-REFERENCE TO RELATED APPLICATIONS

This application is a National Stage filing under 35 U.S.C. 371 of International Application No. PCT/KR2022/019243, filed on Nov. 30, 2022, which claims the priority of Korean Patent Application No. 10-2021-0174869 and 10-2022-0162919 filled on Dec. 8, 2021 and Nov. 29, 2022 in the Korean Intellectual Property Office, the disclosure of which is incorporated herein by reference.

BACKGROUND OF THE DISCLOSURE

Technical Field

The present disclosure relates to a neural processing unit (NPU) for image fusion and to an artificial neural network (ANN) system for image fusion.

Background Art

A thermal image sensor provides a thermal-image video (thermal video) by collecting radiant energy emitted from an object and by visualizing the object even without providing an external light source during filming.

Thermal imaging is largely divided into near-infrared (NIR), short-wave infrared (SWIR), medium-wave infrared (MWIR), and long-wave infrared (LWIR) according to infrared frequency bands. In the past, LWIR has been mainly used in special fields such as military and medical applications. Fields of application of thermal imaging have expanded in recent years, to include night-vision recognition of automobiles and other objects.

In particular, the quality of thermal images is very important in object recognition technology at night. However, since the price of the thermal image sensor varies greatly depending on the resolution, high-resolution infrared image sensors are economically burdensome.

Accordingly, super-resolution (SR) technology for upscaling the resolution of an image obtained from a low-resolution thermal image sensor through an artificial intelligence-based learning algorithm has recently been disclosed.

However, when a thermal image is used as single input data, there is a limit to expressing texture information of an image obtainable by a general visible light image sensor in high resolution. Accordingly, a technique for merging different kinds of images as input data is being developed. However, the conventional image fusion technology requires excessively large amounts of calculation in the process of performing synchronization and matching in units of frames.

The background technology of this disclosure is provided solely to facilitate understanding of this disclosure. It should not be construed as an admission that subject matter forming the background of this disclosure exists as prior art.

SUMMARY OF THE DISCLOSURE

Accordingly, a neural processing unit (NPU) for minimizing the amount of computation based on the image obtained from a heterogeneous image sensor, whereby one image is generated by fusing two features, is required. Also required is an artificial neural network (ANN) system including such an NPU.

The inventor of the present disclosure has developed a neural processing unit and an artificial neural network system capable of effectively processing an artificial neural network model for generating an image satisfying a higher resolution by combining images having different resolutions and image characteristics with respect to one object.

In particular, the inventor of the present disclosure has developed a neural processing unit and artificial neural network system capable of quickly generating high-resolution images by performing concatenation and skip-connection operations that can effectively process different data.

The objects of the present disclosure are not limited to those mentioned above. Other objects not mentioned will be clearly understood by those skilled in the art from the following description.

In order to solve the above problems, there is provided a neural processing unit (NPU) for image fusion. The NPU may include a control unit configured to receive a machine code of an image fusion artificial neural network (ANN) model; an input circuit configured to receive a plurality of input signals corresponding to the image fusion ANN model; a processing element (PE) array configured to perform a main operation of the image fusion ANN model; a special function unit (SFU) circuit configured to perform a special function operation of the image fusion ANN model; and an on-chip memory configured to store data of at least one of the main operation and the special function operation of the image fusion ANN model, wherein the image fusion ANN model is trained to output a third image which is new, by inputting a first image and a second image having different resolutions and image characteristics. The control unit may be further configured to control the PE array, the SFU circuit, and the on-chip memory so that an operation order of the image fusion ANN model is processed in a preset order according to data locality information of the image fusion ANN model included in the machine code. A third image may have a resolution having a value between a resolution of the first image and a resolution of the second image, and a third image may have an image characteristic that is the same as at least one of an image characteristic of the first image and an image characteristic of the second image.

The first image may include an image obtained through a visible ray image sensor.

The second image may include an image obtained through a thermal image sensor.

The first image and the second image may include different images with respect to one object, and the image characteristics of the first image and the second image may be determined by types of image sensors that acquire the first image and the second image. The image fusion ANN model may be configured to input only a portion of the first image and a portion of the second image corresponding to a face area in an object extracted from the first image and the second image.

The third image may include an image to which at least one characteristic that can be determined from the second image is applied to at least a portion of the first image.

The image fusion ANN model may be configured to apply a weight to emphasize at least one characteristic that can be determined from the first image and at least one characteristic that can be determined from the second image.

The image fusion ANN model may be configured to input only RGB values of the first image or a brightness value of each pixel of the first image.

The third resolution of the third image may the same as the first resolution of the first image.

The image fusion ANN model may further trained based on a generative adversarial network (GAN) structure and may correspond to a generator configured to generate a new image by taking different images with respect to one object as inputs. The image fusion ANN model may be configured such that the generator and a discriminator configuring the GAN compete with each other to update a weight for increasing the third resolution of the third image, and the discriminator may be further configured to verify an image generated by the generator.

The image fusion ANN model may be further trained based on a training data set having a format substantially similar to that of the first image and the second image.

The PE array may be further configured to process a convolutional operation and an activation function operation.

The PE array may be further configured to process at least one operation of matrix multiplication, dilated convolution, transposed convolution, and bilinear interpolation for increasing the third resolution of the third image.

The NPU may further include an output unit configured to output at least one inference operation result of the image fusion ANN model. The image fusion ANN model may be further trained to process the at least one inference operation among classification, semantic segmentation, object detection, pose estimation, and prediction by the PE array.

The SFU circuit may include at least one function of skip-connection and concatenation for artificial neural network fusion.

The control unit may include a scheduler configured to control the on-chip memory to preserve specific data stored in the on-chip memory until a specific operation step of the image fusion ANN model based on the data locality information of the image fusion ANN model.

The PE array may include a plurality of threads, and the control unit may be further configured to control the plurality of threads to process parallel sections of the image fusion ANN model based on the data locality information of the image fusion ANN model.

According to another aspect of the present disclosure, there is provided an artificial neural network (ANN) system for image fusion. The ANN system may include a first sensor that acquires a first image having a first resolution and a first image characteristic; a second sensor that acquires a second image having a second resolution less than the first resolution and a second image characteristic different from the first image characteristic; and a neural processing unit (NPU) configured to process an image fusion ANN model trained to output a new third image by inputting a first image and a second image having different resolutions and image characteristics. A third image may have a resolution having a value between a resolution of the first image and a resolution of the second image, and a third image may have an image characteristic that is the same as at least one of an image characteristic of the first image and an image characteristic of the second image.

Further specifics of the examples are included in the following detailed description and accompanying drawings.

According to the present disclosure, a high-resolution thermal image can be generated through an artificial neural network (ANN) model. In particular, according to the present disclosure, the problem of private information being exposed can be prevented by generating and storing only high-resolution thermal images in a device such as a surveillance camera for photographing an unspecified number of people. In addition, according to the present disclosure, privacy-related information can be protected by fusing thermal images only in the face area of a person.

In addition, a high-resolution thermal image may be generated by using a high-resolution general visible light image sensor and a low-resolution thermal image sensor built into a general device rather than a professional device. Accordingly, a high-resolution thermal image can be generated at low cost. In addition, for example, according to the present disclosure, the night vision of an image can be improved in a device owned by a user or in a black box of a vehicle, rather than in a device designed for night vision.

In addition, according to the present disclosure, it is possible to generate a high-resolution thermal image for observing an object even on days when weather conditions are poor. In addition, according to the present disclosure, a high-resolution thermal image of an object can be generated even under low-sensitivity conditions of a laser sensor, an electromagnetic wave sensor, or an ultrasonic sensor, that is, devices other an image sensor used to detect an object. Thus, the neural processing unit of the present disclosure may be installed in a vehicle to improve vehicle safety by curtailing accidents.

In addition, according to the present disclosure, a user's motion may be estimated, through skeleton detection or pose estimation for example, using a high-resolution thermal image. For example, through a device installed in a specific space, a fall or abnormal movement of a user may be estimated.

In addition, according to the present disclosure, a neural processing unit for implementing an image fusion artificial neural network model that generates a new image based on images acquired from heterogeneous image sensors can be controlled to operate more efficiently. Thus, according to the present disclosure, power consumption can be reduced even when processing a huge amount of data. Accordingly, in the present disclosure, an image fusion artificial neural network model can be implemented in various devices without being limited by battery capacity.

In addition, according to the present disclosure, heterogeneous sensing data can be effectively processed through a concatenation operation and a skip-connection operation. Therefore, according to the present disclosure, a high-resolution thermal image can be quickly generated while reducing the amount of computation.

In addition, according to the present disclosure, data stored in an on-chip memory can be maximally reused to minimize power consumption while obtaining data necessary for fusing high-resolution images from an external memory.

Effects according to the disclosure are not limited by the contents exemplified above, and more various effects are included in the present disclosure.

BRIEF DESCRIPTION OF THE DRAWINGS

FIG. 15B is an exemplary diagram illustrating locality information of artificial neural network data of the image fusion artificial neural network model of FIG. 15A.

DETAILED DESCRIPTION OF THE EMBODIMENT

Figure 1:
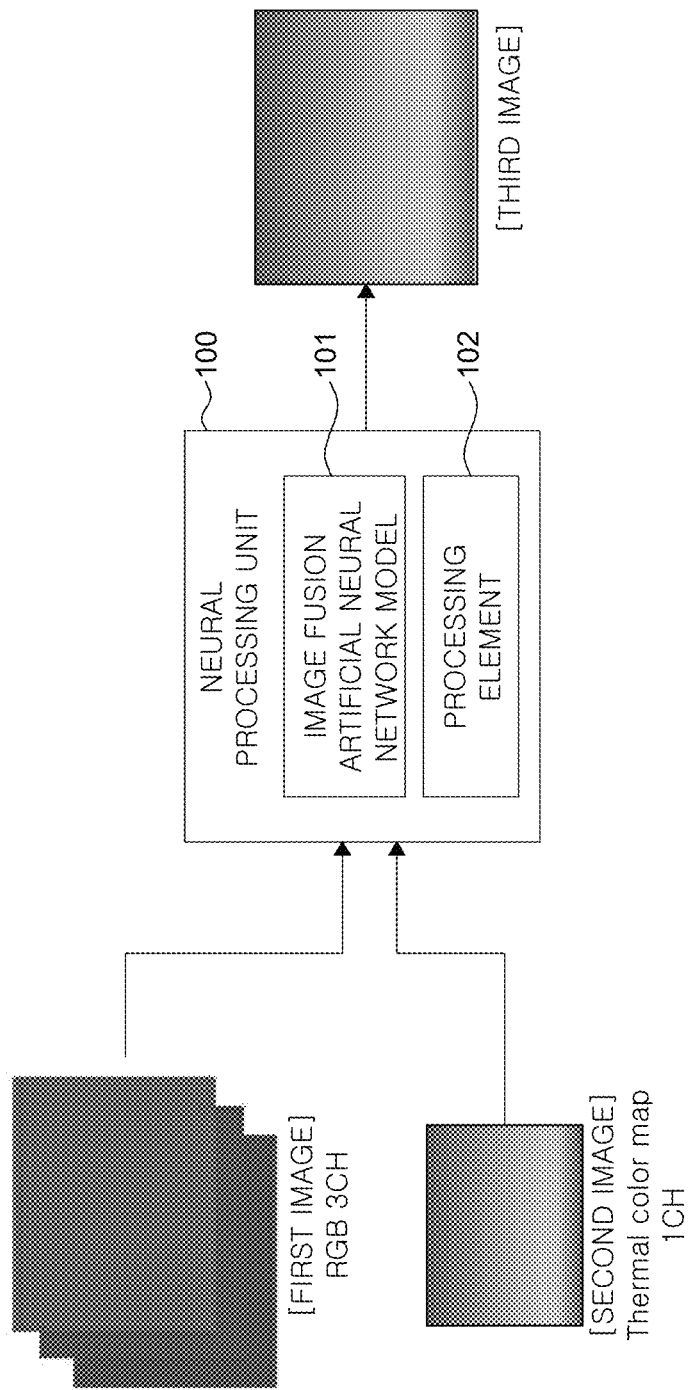
FIGS. 1 and 2 are schematic conceptual diagrams illustrating an image fusion artificial neural network model according to an example of the present disclosure.

Advantages and features of the present disclosure, and methods of achieving them, will become apparent with reference to the examples described below in detail in conjunction with the accompanying drawings. However, the present disclosure is not limited to the examples disclosed below and will be implemented in various different forms. These examples are provided so that the present disclosure is complete, and to fully inform those of ordinary skill in the art to which the present disclosure belongs, the scope of the present disclosure. The present disclosure is only defined by the scope of the claims. In connection with the description of the drawings, like reference numerals may be used for like elements.

In this document, expressions such as "have," "may have," "includes," or "may include" indicate the presence of the corresponding feature (e.g., an element such as a numerical value, function, action, or part), and do not exclude the existence of the additional feature.

In this document, expressions such as "A or B," "at least one of A or/and B," or "one or more of A or/and B" may include all possible combinations of the items listed together. For example, "A or B," "at least one of A and B," or "at least one of A or B" may refer to all instances of (1) including at least one A, (2) including at least one B, or (3) including both at least one A and at least one B.

As used herein, expressions such as "first," "second," or "first or second," as used herein may modify various elements regardless of order and/or importance, and are used only to distinguish one element from another element, and do not limit the elements. For example, the first user device and the second user device may represent different user device regardless of order or importance. For example, without departing from the scope of the rights described in this document, the first element may be named as the second element, and similarly, the second element may also be renamed as the first element.

It should be understood that the certain element may be directly connected to the other element or may be connected through another element (e.g., a third element) when an element (e.g., first element) is referred to as being "(functionally or communicatively) connected ((operatively or communicatively) coupled with/to)" or "in contact with (connected to)" another element (e.g., second element). On the other hand, it may be understood that no the other element (e.g., third element) exists between an element and another element when an element (e.g., first element) is referred to as being "directly connected to" or "directly in contact with" another element (e.g., second element).

The expression "configured to" used in this document may be used interchangeably with, for example, "suitable for," "having the capacity to," "designed to," "adapted to," "made to," or "capable of" depending on the situation. The term "configured (or configured to)" may not necessarily mean only "specifically designed to" in hardware. Instead, in some circumstances, the expression "a device configured to" may mean "a device capable of" in conjunction with other devices or parts. For example, the phrase "a processor configured (or configured to perform) A, B, and C" may mean a dedicated processor (e.g., an embedded processor) for performing the corresponding operation, or a genericpurpose processor (e.g., a CPU or an application processor) capable of performing corresponding operations by executing one or more software programs stored in the memory device.

Terms used in this document are used only to describe specific examples, and may not be intended to limit the scope of other examples. The singular expression may include the plural expression unless the context clearly dictates otherwise. Terms used herein, including technical or scientific terms, may have the same meanings as commonly understood by one of ordinary skill in the art described in this document. Among the terms used in this document, terms defined in a general dictionary may be interpreted with the same or similar meaning to the meaning in the context of the related art, and unless explicitly defined herein, it should not be construed in an idealistic or overly formal sense. In some cases, even terms defined in this document cannot be construed to exclude examples of this document.

Each feature of the various examples of the present disclosure may be partially or wholly combined or combined with each other, as those skilled in the art will fully understand, technically various interlocking and driving are possible, and each example may be implemented independently of each other or may be implemented together in a related relationship.

For clarity of interpretation of the present disclosure, terms used herein will be defined below.

NPU is an abbreviation of neural processing unit, and may mean a processor specialized for computation of an artificial neural network model separately from a central processing unit (CPU).

ANN is an abbreviation of artificial neural network, and may mean a network in which nodes are connected in a layer structure by imitating the connection of neurons in the human brain through synapse in order to imitate human intelligence.

The artificial neural network model is a model for image fusion, and may be a model trained to perform inference such as image/video reconstruction and image/video enhancement.

In addition, another artificial neural network model that takes the fused image as an input may be a model trained to perform inference such as object classification, object detection, object segmentation, object tracking, event recognition, event prediction, anomaly detection, density estimation, event search, measurement, and the like.

For example, the artificial neural network model may be a model such as Transformer, Bisenet, Shelfnet, Alexnet, Densenet, Efficientnet, EfficientDet, Googlenet, Mnasnet, Mobilenet, Resnet, Shufflenet, Squeezenet, VGG, Yolo, RNN, CNN, DBN, RBM, LSTM and the like. However, the present disclosure is not limited thereto, and it may be a new artificial neural network model other than those operable in the NPU 100.

Information on the structure of an artificial neural network includes information on the number of layers, the number of nodes in a layer, the value of each node, information on the calculation processing method, and information on the weight matrix applied to each node.

The information on the data locality of the image fusion artificial neural network model is information including a sequence of data access requests to the memory determined based on the artificial neural network and the structure of a neural processing unit processing the artificial neural network.

DNN is an abbreviation of deep neural network, and may mean that the number of hidden layers of an artificial neural network is increased in order to implement higher artificial intelligence.

CNN is an abbreviation for convolutional neural network, which is a neural network that functions similarly to image processing in the visual cortex of the human brain. Convolutional neural networks are known to be suitable for image processing, and are known to be easy to extract features of input data and identify patterns of features.

A kernel may mean a weight matrix applied to CNN.

The off-chip memory may be a memory arranged in consideration of a limited memory size inside the NPU. That is, a memory may be disposed outside the chip to store large-capacity data. The off-chip memory may include one of memories such as ROM, SRAM, DRAM, resistive RAM, magneto-resistive RAM, phase-change RAM, ferroelectric RAM, flash memory, HBM, and the like. The off-chip memory may be configured of at least one memory unit. The off-chip memory may be configured of a homogeneous memory unit or a heterogeneous memory unit.

The NPU may include on-chip memory. On-chip memory may include volatile memory and/or non-volatile memory. For example, the on-chip memory may include one of memories such as ROM, SRAM, DRAM, resistive RAM, magneto-resistive RAM, phase-change RAM, ferroelectric RAM, flash memory, HBM, and the like. The on-chip memory may be configured of at least one memory unit. The on-chip memory may be configured of a homogeneous memory unit or a heterogeneous memory unit.

Hereinafter, an example of the present disclosure will be described in detail with reference to the accompanying drawings.

Figure 2:
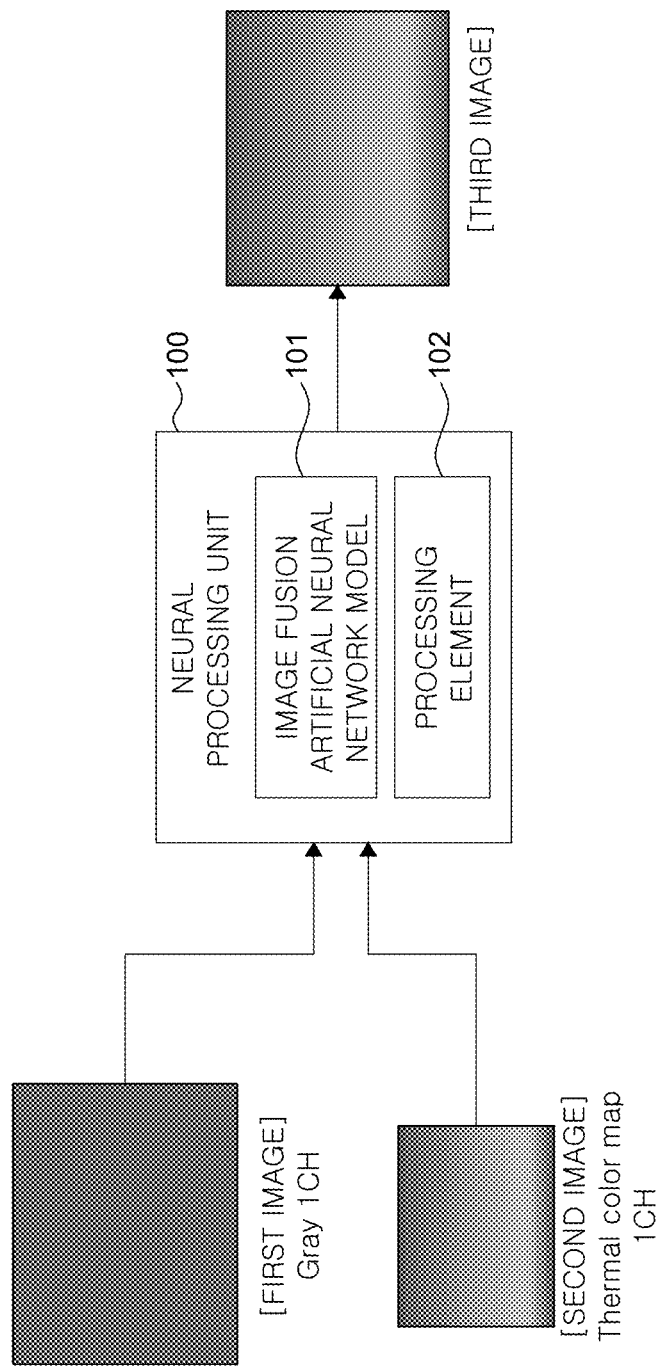

FIGS. 1 and 2 illustrate an image fusion artificial neural network model according to an example of the present disclosure.

Referring to FIG. 1, a neural processing unit 100 includes a processing element 102 configured to perform an operation of an image fusion artificial neural network model 101. The neural processing unit 100 may generate a new image (third image) based on the two images (first image and second image). The first image and the second image are different images of the same object, i.e., one object, and may be obtained from different types of sensors. For example, the heterogeneous sensor may be an image sensor for capturing visible light, an image sensor for capturing infrared light, and the like.

An image sensor for capturing visible light acquires a color image (first image) in the visible light region through red (R), green (G), and blue (B) pixels. The image sensor for infrared imaging may acquire a thermal color map (second image) through pixels. In general, since an infrared image sensor detects energy having a wavelength greater than that of visible light, the number of pixels, that is, the resolution, is inevitably low even if the sensor has the same size. In the present disclosure, it is possible to generate a third image that satisfies the resolution of a visible ray imaging image sensor through the image fusion artificial neural network model 101 without using a high-resolution infrared imaging image sensor.

Thus, the neural processing unit 100 may be a model trained to output a new third image by inputting the first image and the second image having different resolutions and image characteristics. The third resolution of the third image may have a value between the first resolution of the first image and the second resolution of the second image. For example, the third resolution of the third image may be the same as the first resolution of the first image. Also, the third image characteristic of the third image may be at least partially the same as the first image characteristic of the first image or the second image characteristic of the second image. In other words, the third image characteristic of the third image may be the same as (equal to) at least one of the first image characteristic of the first image and the second image characteristic of the second image. For example, when the first resolution of each RGB channel of the first image is 1024×786 and the second resolution of the thermal image channel of the second image is 100×60, the third resolution of the third image may be 1024×786. That is, the resolution of the third image is the same as the first resolution of the first image, and a thermal image corresponding to the second image characteristic may be applied to the third image characteristic.

In another example, the neural processing unit 100 may use different input data from the image fusion artificial neural network model 101. Specifically, when the first image is a color image, the processing speed of the neural processing unit 100 may increase. Accordingly, the image fusion artificial neural network model 101 can reduce the processing speed of the neural processing unit 100 while generating a third image identical to that of a color image by taking only the brightness value of each pixel of the first image as an input. That is, the image fusion artificial neural network model 101 may be a model configured to input only RGB values (three channels) of the first image or brightness values (one channel) for each pixel of the first image.

In this way, the weight parameters of the image fusion artificial neural network model 101 capable of generating a new image by combining characteristics of different images may be learned based on a generative adversarial network (GAN) structure. The GAN structure is composed of a generator that generates a virtual or real image and a discriminator that determines whether the image generated by the generator is authentic or not. A GAN can be a model in which a generator and a discriminator compete against each other to improve each other's performance. Specifically, the generator provides real data to the discriminator so that the discriminator learns to determine that a video is genuine, and secondly, by inputting a virtual video (fake data) generated by the generator, the discriminator can learn to discriminate the video as fake. Then, the generator can then develop to create a harmonious image according to the mutual competition by training to create a virtual image to deceive the discriminator.

That is, in the training step, the image fusion artificial neural network model 101 may be a model configured such that a generator and a discriminator configuring the GAN compete with each other to update weights for increasing the third resolution of the third image.

In the present disclosure, in order to minimize memory usage of the neural processing unit 100, image generation training through a generator may be performed in a separate device/server (not shown). Also, the image fusion artificial neural network model 101 operated by the neural processing unit 100 may correspond to a generator configured to generate a new image (e.g., a high-resolution thermal image) by using as inputs two different images of one object. For example, one of the two different images may be a high-resolution visible light image, while the other is a low-resolution thermal image.

Meanwhile, the image fusion artificial neural network model 101 may be trained based on a set of training data substantially similar to the first image and the second image. In other words, the training data set may have a format substantially similar to that of the first image and the second image. That is, an image used for training may be different from an image received to generate a new image thereafter.

Hereinafter, an image generated through an image fusion artificial neural network model will be described as an example.

Figure 3:
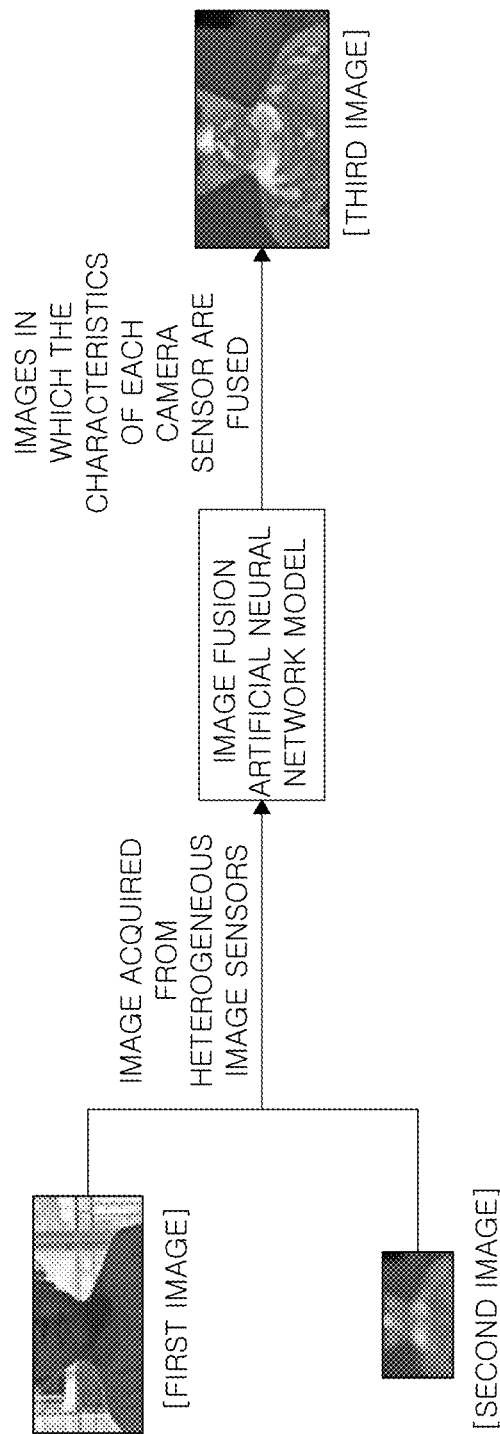
FIGS. 3 and 4 are schematic conceptual views illustrating an image generated through an image fusion artificial neural network model according to an example of the present disclosure.
Figure 4:
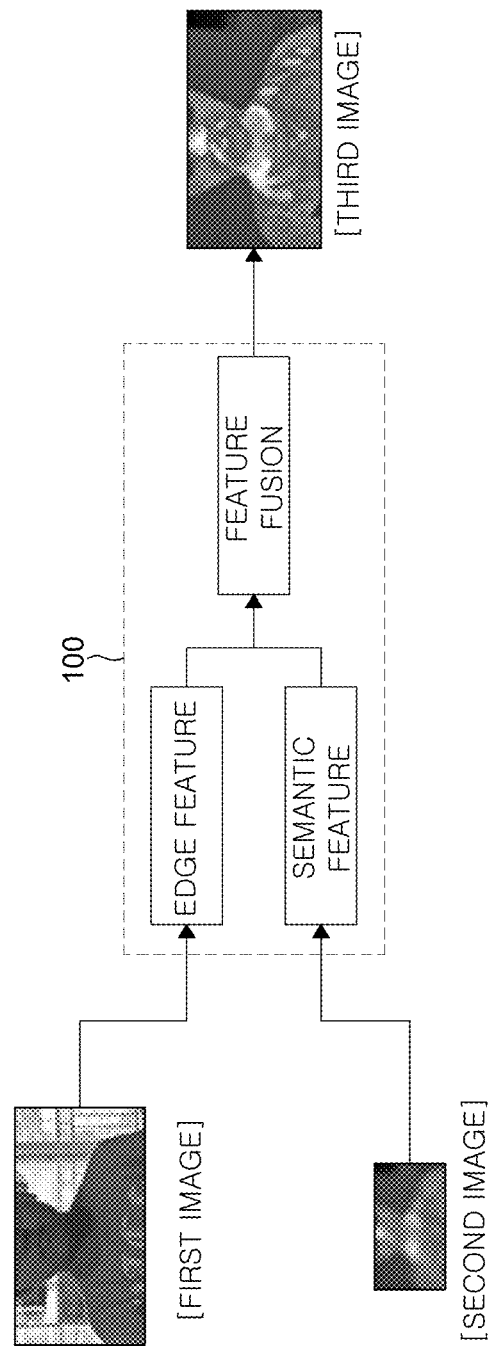

FIGS. 3 and 4 illustrate an image generated through an image fusion artificial neural network model according to an example of the present disclosure.

Referring to FIG. 3, the image fusion artificial neural network model may take as input images acquired from different types of sensors. For example, the heterogeneous sensor may be an image sensor for capturing visible light, an image sensor for capturing infrared light, or the like. The image fusion artificial neural network model may take as inputs a first image and a second image obtained by different image sensors for one object. Also, the image fusion artificial neural network model may generate an image in which image characteristics of each image sensor are fused based on images acquired from different types of image sensors. That is, the image fusion artificial neural network model can generate a third image in which thermal information (second image characteristics) of the second image is reflected while maintaining the size and resolution of the first image.

In another example, the image fusion artificial neural network model may be a model to which weights are applied to emphasize at least one feature determinable from the first image and at least one feature determinable from the second image. Specifically, the neural processing unit 100 may generate features of the first image and the second image. For example, the neural processing unit 100 may generate a feature map by inferring features of high-resolution edge content from a first image, which is a color image. A feature map may be referred to as a heat map, an activation map, or a parameter.

Also, the neural processing unit 100 may generate a feature map by inferring segmentation according to temperature in the second image, which is a thermal image. Subsequently, image fusion of the high-resolution thermal image may be processed based on the high-resolution edge feature map and the low-resolution temperature segmentation feature map.

For some examples, the neural processing unit 100 may further detect the presence of an object as a feature of the first image, and may determine an area having a temperature greater than or equal to a threshold value as a feature of the second image. Accordingly, the image fusion artificial neural network model may generate a new image by applying weights to determinable features in each image. For example, as shown in FIG. 4, the neural processing unit 100 may detect an object (e.g., a human) in the first image and perform thermal imaging on only an area having a specific temperature or higher within the area where the object is detected. That is, the neural processing unit 100 may generate a third image to which at least one feature that can be determined from the second image is applied to at least a partial area of the first image.

Meanwhile, in order to generate a high-resolution thermal image limited to a partial area as described above, the processing element array of the neural processing unit 100 may be configured to process at least one operation among dilated convolution, transposed convolution, and bilinear interpolation operation.

In another example, the neural processing unit 100 may extract a first partial image and a second partial image corresponding to the face area from each of the first image and the second image obtained by capturing one object. In other words, the neural processing unit 100 may extract a partial image from each of the first image and the second image obtained by capturing one object, each partial image corresponding to the face area. Accordingly, the neural processing unit 100 may generate a fused image of image features only on the face using an artificial neural network model configured to input only the first partial image and the second partial image.

In this way, the neural processing unit 100 fusion-generates an image in which different image characteristics are applied only to the human face area, thereby protecting personal information.

Hereinafter, the neural processing unit 100 that performs an operation of an image fusion artificial neural network model will be described.

Figure 5:
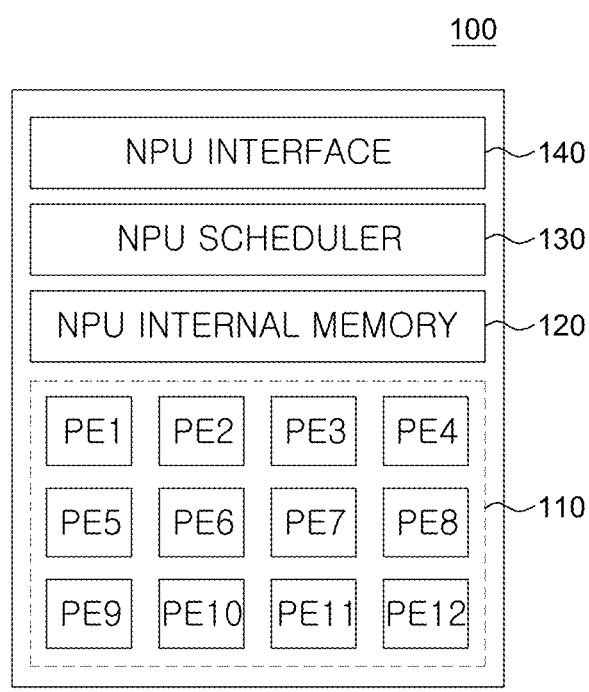
FIG. 5 is a schematic conceptual diagram illustrating a neural processing unit according to an example of the present disclosure.

FIG. 5 illustrates a neural processing unit (NPU) according to an example of the present disclosure.

As shown in FIG. 5, the NPU 100 is a processor specialized to perform an operation for an image fusion artificial neural network model.

An artificial neural network refers to a network of artificial neurons that multiply and add weights when various inputs or stimuli come in, and transform and transmit the value obtained by adding additional deviations through an activation function. The artificial neural network trained in this way can be used to output an inference result from input data.

The NPU 100 may be a semiconductor device implemented as an electric/electronic circuit. An electric/electronic circuit may be a circuit including a number of electronic devices (e.g., transistors and capacitors).

Referring to FIG. 5, the NPU 100 may include a processing element (PE) array 110, an NPU internal memory 120, an NPU scheduler 130, and an NPU interface 140. Each of the processing element array 110, NPU internal memory 120, NPU scheduler 130, and NPU interface 140 may be a semiconductor circuit to which numerous transistors are connected. Accordingly, some of them may be difficult to discern and distinguish with the naked eye, and may only be identified by operations. For example, an arbitrary circuit may operate as the processing element array 110 or as the NPU scheduler 130. The NPU scheduler 130 may be configured to perform a function of a control unit configured to control an artificial neural network inference operation of the NPU 100. To elaborate, a portion of the control unit may be referred to as the scheduler 130. The NPU scheduler 130 may be part of the control unit. The NPU scheduler 130 may also be referred to as a control unit. The control unit may include the NPU scheduler 130. The control unit may be a common name for circuits that perform various control functions of the NPU 100, such as direct memory access (DMA). It is also possible that the control unit is defined by the function of the circuit. In other words, a circuit for controlling the processing element array 110 according to the sequence of each operation step of the artificial neural network model based on the locality of the artificial neural network data of the artificial neural network model by the control unit may be defined as the NPU scheduler 130.

The NPU 100 may include a processing element array 110, an NPU internal memory 120 configured to store an image fusion artificial neural network model that can be inferred from the processing element array 110, and an NPU scheduler 130 configured to control the processing element array 110 and the NPU internal memory 120 based on information on the locality information or structure of artificial neural network data of an image fusion artificial neural network model. Here, the NPU internal memory 120 may store information on locality or structure of artificial neural network data of an image fusion artificial neural network model. That is, the image fusion artificial neural network model may refer to an AI recognition model trained to perform a specific inference function (e.g., image fusion, object motion, object posture, motion tracking, and the like).

The processing element array 110 may perform operations for an artificial neural network.

The NPU interface 140 may communicate with various components, such as memory, connected to the NPU 100 through a system bus (e.g., one or more communication buses or signal lines).

The NPU scheduler 130 may be configured to control an operation of the processing element array 100 for an inference operation of the neural processing unit 100 and a reading and writing order of the NPU internal memory 120.

The NPU scheduler 130 may be configured to control the processing element array 100 and the NPU internal memory 120 based on locality information or structure information of artificial neural network data of an image fusion artificial neural network model.

The NPU scheduler 130 may analyze the structure of an image fusion artificial neural network model to be operated in the processing element array 100 or may receive previously analyzed information. The analyzed information may be included in the machine code. For example, artificial neural network data that can be included in the image fusion artificial neural network model may include at least some of node data (i.e., feature map) of each layer, arrangement data of layers, information on locality or structure, and weight data (i.e., weight kernel) of each network connecting nodes of each layer. Data of the artificial neural network may be stored in memory provided inside the NPU scheduler 130 or in the NPU internal memory 120. NPU scheduler 130 may be operated by a machine code.

The NPU scheduler 130 may schedule an operation sequence of the image fusion artificial neural network model to be performed by the NPU 100 based on artificial neural network data locality information or structure information of the image fusion artificial neural network model. Machine code may include scheduling data. NPU scheduler 130 may operate according to scheduling included in machine code. That is, the NPU scheduler 130 may be configured to operate by machine code.

The NPU scheduler 130 may obtain memory address values at which feature maps and weight data of layers of the image fusion artificial neural network model are stored based on locality information or structure information of the artificial neural network data of the image fusion artificial neural network model. For example, the NPU scheduler 130 may obtain a memory address value at which a feature map and weight data of a layer of an image fusion artificial neural network model stored in a memory are stored. Accordingly, the NPU scheduler 130 may retrieve feature maps and weight data of layers of an image fusion artificial neural network model to be driven from the memory 200 and store them in the NPU internal memory 120.

A feature map of each layer may have a corresponding memory address value.

Each weight data may have a corresponding memory address value of the NPU internal memory 120.

The NPU scheduler 130 may schedule an operation sequence of the processing element array 110 based on information on the locality of artificial neural network data or structure of the image fusion artificial neural network model, for example, arrangement data of artificial neural network layers of an image fusion artificial neural network model, locality information, or information on structure.

Since the NPU scheduler 130 performs scheduling based on locality information or structure information of artificial neural network data of an image fusion artificial neural network model, it may operate differently from a general CPU scheduling concept. General CPU scheduling takes into account fairness, efficiency, stability, response time, and the like, and operates to achieve the best efficiency. That is, it is scheduled to perform the most processing within the same time considering priority, operation time, and the like.

A conventional CPU uses an algorithm for scheduling tasks in consideration of data such as the priority order of each processing and operation processing time.

Unlike this, the NPU scheduler 130 may control the NPU 100 in the processing sequence of the NPU 100 determined based on information on the locality or structure of the artificial neural network data of the image fusion artificial neural network model.

Furthermore, the NPU scheduler 130 may drive the NPU 100 in a processing sequence determined based on the information on the locality information or structure of the artificial neural network data of the image fusion artificial neural network model and/or information on the locality information or structure of the data of the neural processing unit 100 to be used.

However, the present disclosure is not limited to data locality information or structure information of the NPU 100.

The NPU scheduler 130 may be configured to store data locality information or structure information of an artificial neural network.

That is, the NPU scheduler 130 may determine the processing sequence even when using only the locality information or structure information of the artificial neural network data of the image fusion artificial neural network model.

Furthermore, the NPU scheduler 130 may determine the processing sequence of the NPU 100 in consideration of the artificial neural network data locality information or structure information of the image fusion artificial neural network model and the data locality information or structure information of the NPU 100. In addition, processing optimization of the NPU 100 may be performed according to the determined processing sequence.

The processing element array 110 refers to a configuration in which a plurality of processing elements PE1 to PE12 configured to calculate feature maps and weight data of an artificial neural network are disposed. Each processing element may include a multiply and accumulate (MAC) operator and/or an arithmetic logic unit (ALU) operator. However, examples according to the present disclosure are not limited thereto.

In FIG. 5, although a plurality of processing elements is shown as an example, it is also possible to substitute a MAC within one processing element and configure a plurality of multipliers and operators implemented as an adder tree to be arranged in parallel. In this case, the processing element array 110 may also be referred to as at least one processing element including a plurality of operators.

The processing element array 110 is configured to include a plurality of processing elements PE1 to PE12. The plurality of processing elements PE1 to PE12 of FIG. 3 are merely examples for convenience of explanation, and the number of the plurality of processing elements PE1 to PE12 is not limited. The size (or number) of the processing element array 110 may be determined by the number of the plurality of processing elements PE1 to PE12. The size of the processing element array 110 may be implemented in the form of an N×M matrix. Here, N and M are integers greater than zero. Processing element array 110 may include N×M processing elements. That is, there may be one or more processing elements.

The size of the processing element array 110 may be designed in consideration of the characteristics of an image fusion artificial neural network model in which the NPU 100 operates. Accordingly, a utilization rate of the processing element array 110, expressed as a percentage, may be improved.

The processing element array 110 is configured to perform functions such as addition, multiplication, and accumulation necessary for artificial neural network operations. Stated differently, the processing element array 110 may be configured to perform multiplication and accumulation (MAC) operations.

The processing element array 110 may be configured to quantize and output MAC operation results. However, examples of the present disclosure are not limited thereto.

The NPU internal memory 120 may store all or part of the image fusion artificial neural network model according to the memory size and the data size of the image fusion artificial neural network model.

Hereinafter, the first processing element PE1 of the processing element array 110 will be described as an example.

Figure 6:
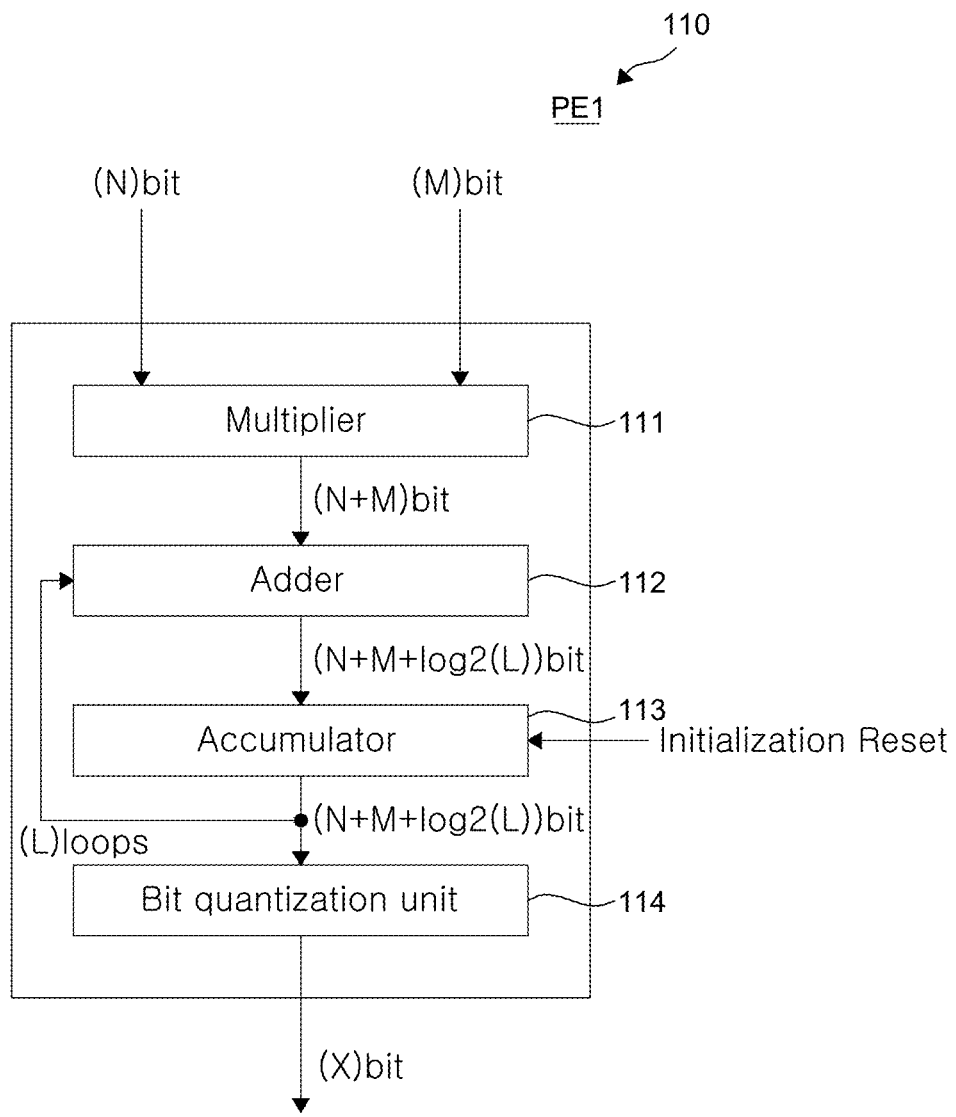
FIG. 6 is a schematic conceptual diagram illustrating one processing element of the processing element array of FIG. 5.

FIG. 6 illustrates one processing element of the array of processing elements of FIG. 5.

Referring to FIG. 6, the first processing element PE1 may include a multiplier 111, an adder 112, an accumulator 113, and a bit quantization unit 114. However, examples according to the present disclosure are not limited thereto, and the processing element array 110 may be modified in consideration of the computational characteristics of an artificial neural network.

The multiplier 111 multiplies the received (N) bit data and (M) bit data. The operation value of the multiplier 111 is output as (N+M) bit data.

The multiplier 111 may be configured to receive input of one variable and one constant.

The accumulator 113 accumulates the operation value of the multiplier 111 and the operation value of the accumulator 113 by using the adder 112 as many times as (L) loops. Accordingly, the bit width of the data of the output unit of the accumulator 113 and the input circuit may be output as (N+M+log 2(L)) bits, where L is an integer greater than zero.

When the accumulation is completed, the accumulator 113 may receive an initialization reset to initialize data stored in the accumulator 113 to zero. However, examples according to the present disclosure are not limited thereto.

The bit quantization unit 114 may reduce the bit width of data output from the accumulator 113. The bit quantization unit 114 may be controlled by the NPU scheduler 130. The bit width of the quantized data may be output as (X) bits, where X is an integer greater than zero. According to the configuration described above, the processing element array 110 is configured to perform a MAC operation, and the processing element array 110 has an effect of quantizing and outputting a result of the MAC operation. In particular, such quantization has an effect of further reducing power consumption as (L) loops increase. In addition, when power consumption is reduced, there is an effect of reducing heat generation. In particular, reducing heat generation has an effect of reducing the possibility of malfunction due to high temperature of the NPU 100.

The output data (X) bits of the bit quantization unit 114 may be node data of the next layer or input data of convolution. If the image fusion artificial neural network model is quantized, the bit quantization unit 114 may be configured to receive quantized feature maps and/or weights from the image fusion artificial neural network model. However, it is not limited thereto, and the NPU scheduler 130 may also be configured to extract quantized information by analyzing the image fusion artificial neural network model. Therefore, to correspond to the size of the quantized data, the output data (X) bits may be converted into a quantized bit width and then output. The output data (X) bits of the bit quantization unit 114 may be stored in the NPU internal memory 120 with a quantized bit width.

That is, the processing element array 110 of the NPU 100 according to an example of the present disclosure may include a multiplier 111, an adder 112, an accumulator 113, and a bit quantization unit 114.

Hereinafter, another example of the NPU 100 of the present disclosure will be described.

Figure 7:
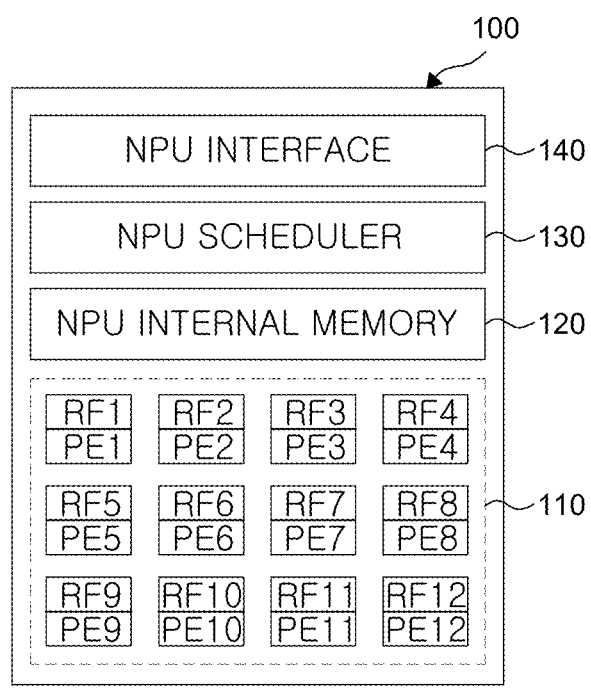
FIG. 7 is a conceptual diagram illustrating a modified example of the neural processing unit of FIG. 5.

FIG. 7 illustrates a modified example of the neural processing unit of FIG. 5.

The NPU 100 of FIG. 7 is substantially the same as the processing unit 100 of FIG. 5, except for the processing element array 110. Therefore, for convenience of description below, redundant description will be omitted.

Referring to FIG. 7, the processing element array 110 may further include, in addition to the plurality of processing elements PE1 to PE12, respective register files RF1 to RF12 corresponding to each of the processing elements PE1 to PE12.

However, the plurality of processing elements PE1 to PE12 and the plurality of register files RF1 to RF12 of FIG. 7 are merely examples for convenience of description, and the number of the plurality of processing elements PE1 to PE12 and the plurality of register files RF1 to RF12 are not limited thereto.

The size of the processing element array 110 may be determined by the number of the plurality of processing elements PE1 to PE12 and the plurality of register files RF1 to RF12. The size of the processing element array 110 and the plurality of register files RF1 to RF12 may be implemented in the form of an N×M matrix where N and M are integers greater than zero.

The array size of the processing element array 110 may be designed in consideration of the characteristics of an image fusion artificial neural network model in which the NPU 100 operates. To elaborate, the memory size of the register file may be determined in consideration of the data size of the image fusion artificial neural network model to operate, the required operation speed, and the required power consumption.

The register files RF1 to RF12 of the NPU 100 are static memory units directly connected to the processing elements PE1 to PE12. The register files RF1 to RF12 may be composed of, for example, flip-flops and/or latches. The register files RF1 to RF12 may be configured to store MAC operation values of corresponding processing elements PE1 to PE12. The register files RF1 to RF12 may be configured to provide or receive weight data and/or node data from the NPU internal memory 120.

The register files RF1 to RF12 may also be configured to perform the function of the temporary memory of the accumulator during MAC operation.

The register files RF1 to RF12 may temporarily store the feature map after calculation is completed, and then reuse the feature map in the next calculation to reduce power consumption.

Hereinafter, calculation of an exemplary image fusion artificial neural network model 110-10 that can be operated in the NPU 100 will be described.

Figure 8:
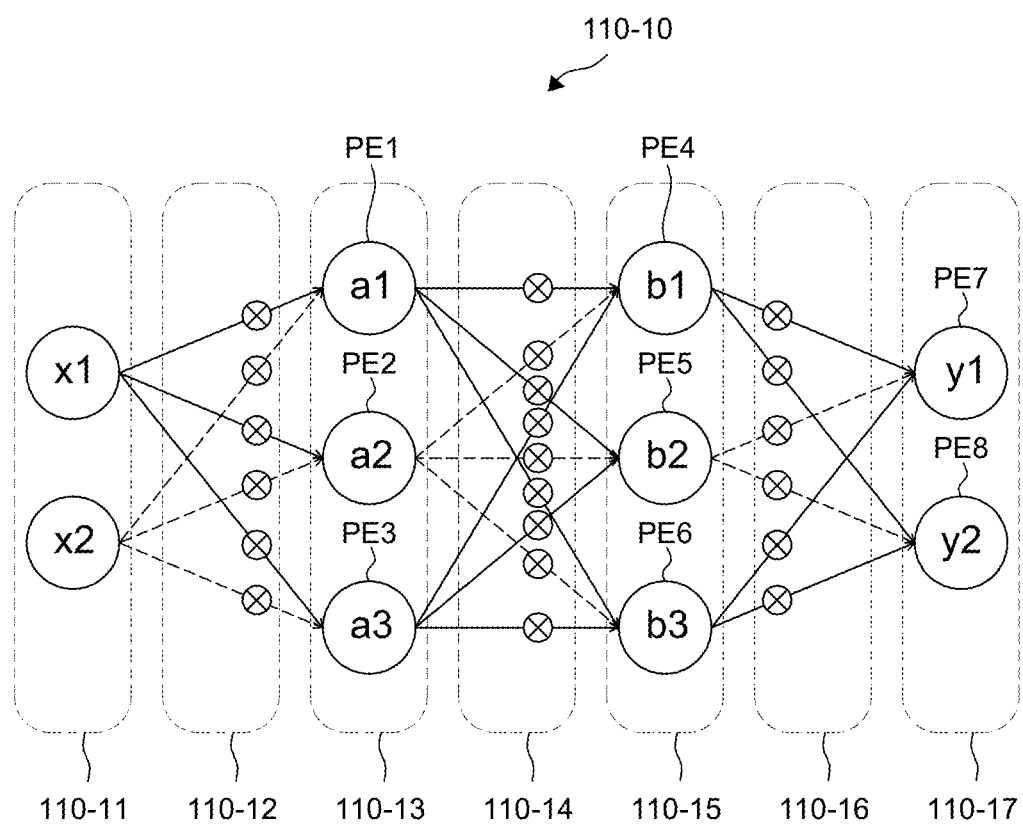
FIG. 8 is a conceptual diagram illustrating an image fusion artificial neural network model according to an example of the present disclosure.

FIG. 8 illustrates an image fusion artificial neural network model according to an example of the present disclosure.

The image fusion artificial neural network model 110-10 of FIG. 8 may be an artificial neural network trained in the NPU 100 of FIG. 5 or 7 or trained in a separate machine learning device. The image fusion artificial neural network model 110-10 may be an artificial neural network trained to perform various inference functions such as motion and posture estimation of an object in an image.

The image fusion artificial neural network model 110-10 may be a DNN (deep neural network). However, the image fusion artificial neural network model 110-10 according to examples of the present disclosure is not limited to a deep neural network.

For example, the image fusion artificial neural network model may be a model trained to perform inference such as image/video reconstruction and image/video enhancement.

In addition, other artificial neural network models that take fused images as inputs may be models trained to perform inference such as super-resolution, upscaling, image-fusion, object classification, object detection, object segmentation, object tracking, event recognition, event prediction, anomaly detection, density estimation, event search, measurement, and the like.

For example, the image fusion artificial neural network model may be a model such as Transformer, Bisenet, Shelfnet, Alexnet, Densenet, Efficientnet, EfficientDet, Googlenet, Mnasnet, Mobilenet, Resnet, Shufflenet, Squeezenet, VGG, Yolo, RNN, CNN, DBN, RBM, LSTM, and the like. However, the present disclosure is not limited thereto, and may be a new artificial neural network model other than the one operable in the NPU 100.

In various examples, the image fusion artificial neural network model 110-10 may be an ensemble model based on at least two different models.

At least some of parameters such as weight values, node values, accumulated values, feature maps, and weights of each layer of the image fusion artificial neural network model 110-10 may be stored in the NPU internal memory 120 of the NPU 100.

Specifically, referring to FIG. 8, the inference process by the image fusion artificial neural network model 110-10 may be performed by the NPU 100.

The image fusion artificial neural network model 110-10 is an exemplary deep neural network model including an input layer 110-11, a first connection network 110-12, a first hidden layer 110-13, a second connection network (110-14), a second hidden layer 110-15, a third connection network 110-16, and an output layer 110-17. However, the present disclosure is not limited to the image fusion artificial neural network model of FIG. 8. The first hidden layer 110-13 and the second hidden layer 110-15 may also be referred to as a plurality of hidden layers.

The input layer 110-11 may illustratively include x1 and x2 input nodes. That is, the input layer 110-11 may include information on two input values. The NPU scheduler 130 of FIG. 5 or 7 may set the memory address where the information on the input value from the input layer 110-11 is stored in the NPU internal memory 120 of FIG. 5 or 7.

Exemplarily, the first connection network 110-12 may include information on six weight values for connecting each node of the input layer 110-11 to each node of the first hidden layer 110-13. The NPU scheduler 130 of FIG. 5 or 7 may set a memory address in which information about weight values of the first connection network 110-12 is stored in the NPU internal memory 120. Each weight value is multiplied with the input node value, and the accumulated value of the multiplied values is stored in the first hidden layer 110-13. Here, nodes having accumulated values may be referred to as feature maps.

The first hidden layer 110-13 may illustratively include nodes a1, a2, and a3. That is, the first hidden layers 110-13 may include information about three node values. The NPU scheduler 130 of FIG. 5 or 7 may set a memory address for storing information about node values of the first hidden layers 110-13 in the NPU internal memory 120.

The NPU scheduler 130 may be configured to schedule an operation sequence such that the first processing element PE1 performs the MAC operation of the a1 node of the first hidden layer 110-13. The NPU scheduler 130 may be configured to schedule an operation sequence so that the second processing element PE2 performs the MAC operation of the a2 node of the first hidden layer 110-13. The NPU scheduler 130 may be configured to schedule an operation sequence so that the third processing element PE3 performs the MAC operation of the a3 node of the first hidden layer 110-13. Here, the NPU scheduler 130 may pre-schedule an operation sequence such that three processing elements perform MAC operations in parallel and simultaneously. The scheduling information may be included in machine code. Accordingly, the NPU scheduler 130 may operate according to scheduling information included in machine code.

Illustratively, the second connection network 110-14 may include information on nine weight values for connecting each node of the first hidden layer 110-13 to each node of the second hidden layer 110-15. The NPU scheduler 130 of FIG. 5 or 7 may set a memory address for storing information on the weight value of the second connection network 110-14 in the NPU internal memory 120. The weight value of the second connection network 110-14 is multiplied with the node value input from the first hidden layer 110-13, and the accumulated value of the multiplied values is stored to the second hidden layer 110-15.

The second hidden layer 110-15 may illustratively include b1, b2, and b3 nodes. That is, the second hidden layers 110-15 may include information about three node values. The NPU scheduler 130 may set a memory address for storing information about node values of the second hidden layer 110-15 in the NPU internal memory 120.

The NPU scheduler 130 may be configured to schedule an operation sequence so that the fourth processing element PE4 performs the MAC operation of the b1 node of the second hidden layer 110-15. The NPU scheduler 130 may be configured to schedule an operation sequence so that the fifth processing element PE5 performs the MAC operation of the node b2 of the second hidden layer 110-15. The NPU scheduler 130 may be configured to schedule an operation sequence so that the sixth processing element PE6 performs the MAC operation of the b3 node of the second hidden layer 110-15. The scheduling information may be included in a machine code.

Here, the NPU scheduler 130 may pre-schedule an operation sequence such that three processing elements perform MAC operations in parallel and simultaneously.

Here, the NPU scheduler 130 may determine scheduling such that the operation of the second hidden layer 110-15 is performed after the MAC operation of the first hidden layer 110-13 of the image fusion artificial neural network model.

That is, the NPU scheduler 130 may be configured to control the processing element array 100 and the NPU internal memory 120 based on locality information or structure information of the artificial neural network data of the image fusion artificial neural network model.

Illustratively, the third connection network 110-16 may include information on six weight values connecting each node of the second hidden layer 110-15 and each node of the output layer 110-17. The NPU scheduler 130 may set a memory address for storing information about weight values of the third connection networks 110-16 in the NPU internal memory 120. The weight value of the third connection network 110-16 is multiplied with the node value input from the second hidden layer 110-15, and the accumulated value of the multiplied values is stored in the output layer 110-17.

Illustratively, the output layer 110-17 may include nodes y1 and y2. That is, the output layers 110-17 may include information on two node values. The NPU scheduler 130 may set a memory address in the NPU internal memory 120 to store information on node values of the output layers 110-17.

The NPU scheduler 130 may be configured to schedule an operation sequence such that the seventh processing element PE7 performs the MAC operation of the node y1 of the output layer 110-17. The NPU scheduler 130 may be configured to schedule an operation sequence such that the eighth processing element PE8 performs the MAC operation of the y2 node of the output layer 110-15. The scheduling information may be included in a machine code.

Here, the NPU scheduler 130 may pre-schedule an operation sequence such that two processing elements perform MAC operations in parallel and simultaneously.

Here, the NPU scheduler 130 may determine scheduling such that the operation of the output layer 110-17 is performed after the MAC operation of the second hidden layer 110-15 of the image fusion artificial neural network model.

That is, the NPU scheduler 130 may be configured to control the processing element array 100 and the NPU internal memory 120 based on locality information or structure information of the artificial neural network data of the image fusion artificial neural network model.

That is, the NPU scheduler 130 may analyze the structure of the image fusion artificial neural network model to be operated in the processing element array 100 or may receive analyzed information. Artificial neural network information that can be included in the image fusion artificial neural network model may include information on the node value of each layer, information on the locality or structure of the arrangement data of the layers, information on the weight value of each network connecting the nodes of each layer.

Since the NPU scheduler 130 is provided with information on the artificial neural network data locality information or structure of the exemplary image fusion artificial neural network model 110-10, the NPU scheduler 130 may determine the operation sequence from input to output of the image fusion artificial neural network model 110-10.

Accordingly, the NPU scheduler 130 may set a memory address at which MAC calculation values of each layer are stored in the NPU internal memory 120 in consideration of a scheduling sequence.

The NPU internal memory 120 may be configured to preserve weight data of networks stored in the NPU internal memory 120 while the inference operation of the NPU 100 continues. Accordingly, there is an effect of reducing a memory read/write operation.

That is, the NPU internal memory 120 may be configured to reuse the MAC operation value stored in the NPU internal memory 120 while the inference operation continues.

Hereinafter, the structure of the image fusion artificial neural network model of the present disclosure will be described with reference to FIGS. 9 to 12.

Figure 9:
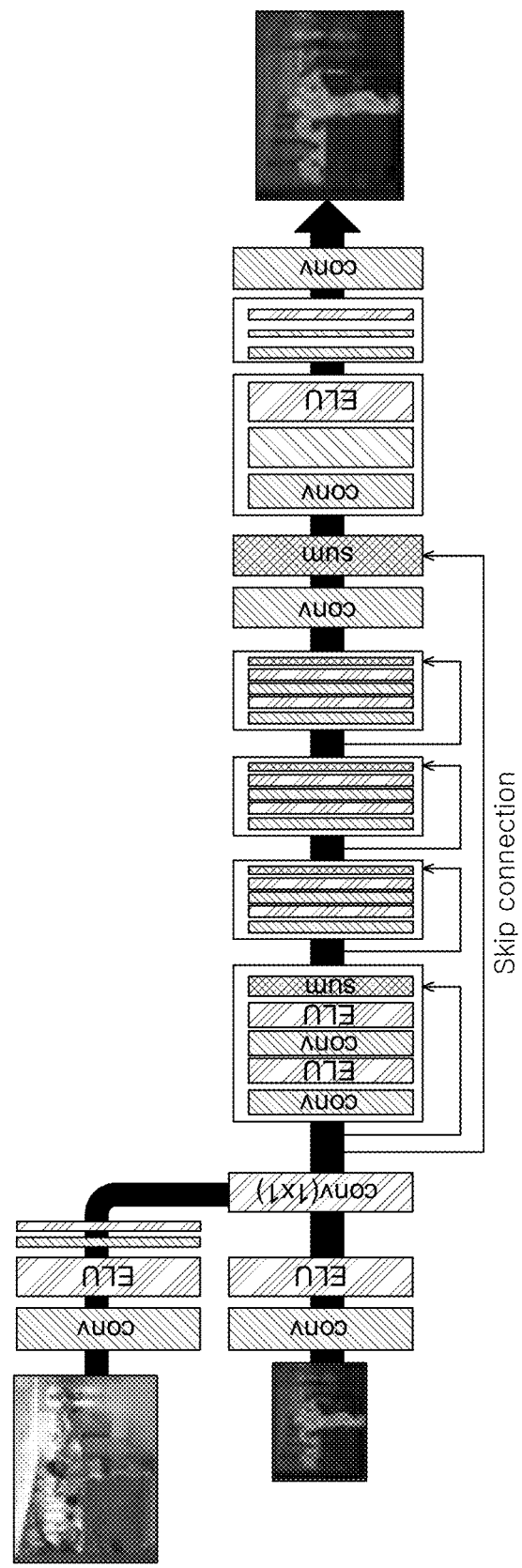
FIG. 9 is a diagram for explaining a partial structure of a GAN neural network configuring an image fusion artificial neural network model according to an example of the present disclosure.

FIG. 9 is a diagram for explaining a partial structure of a GAN configuring an image fusion artificial neural network model according to an example of the present disclosure.

Referring to FIG. 9, the GAN neural network structure configuring the image fusion artificial neural network model has a structure corresponding to a generator for generating a high-resolution thermal image. That is, the scheduler 130 of the neural processing unit 100 may be configured to process an inference operation by receiving a machine code compiled from an image fusion artificial neural network model excluding the discriminator.

In one example, the image fusion artificial neural network model corresponding to the generator can use each RGB three-channel visible light image and one-channel thermal image as input data, and can output a feature map and/or an activation map by performing a convolution operation to which an activation function (ELU) is applied. For example, input data of a visible light image may be calculated by 64 of sliding 3×3 filters for each channel, and input data of a thermal image may be calculated by 64 of sliding 3×3 filters. That is, the size of the feature map of the input data of the visible light image may be reduced to the same size as that of the feature map output from the input data of the thermal image before image fusion. The output feature maps output through each operation may be merged into one filter having a size of 1×1. The feature maps merged in this way can transfer output results to other layers through a skip-connection operation, and finally generate a high-resolution thermal image through a plurality of layers. FIG. 9 is just one example for configuring a generator in a GAN, and is not limited thereto, and configurations of various models may be employed.

Figure 10:
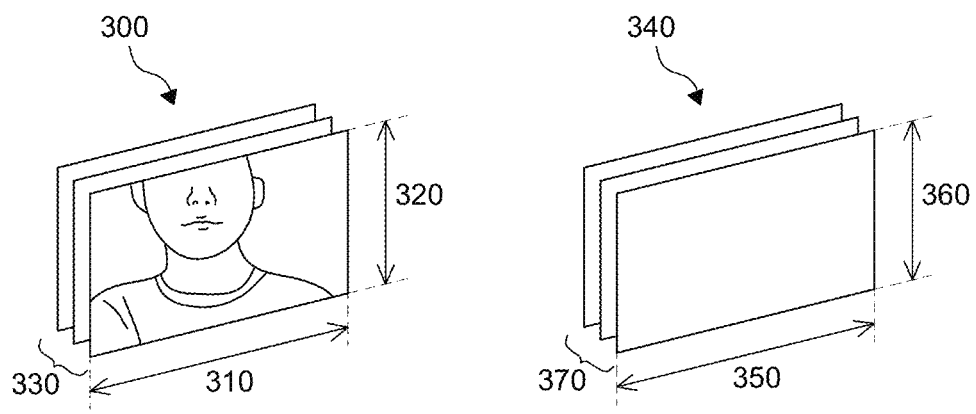
FIG. 10 is a diagram for explaining input data of the convolution layer of FIG. 9 and a kernel used for a convolution operation.

FIG. 10 is a diagram for explaining input data of the convolution layer of FIG. 9 and a kernel used for a convolution operation or matrix multiplication.

Referring to FIG. 10, input data 300 may be an image or video displayed in a two-dimensional matrix composed of rows 310 of a specific size and columns 320 of a specific size. The input data 300 may be referred to as a feature map. The input data 300 may have a plurality of channels 330, where the channels 330 may represent color RGB channels of the input data image.

Meanwhile, the kernel 340 may be a weight parameter used in convolution for extracting a feature of a certain portion of the input data 300 while scanning it. Like the input data image, the kernel 340 may be configured to have rows 350 of a specific size, columns 360 of a specific size, and a specific number of channels 370. In general, the sizes of rows 350 and columns 360 of the kernel 340 are set to be the same, and the number of channels 370 may be the same as the number of channels 330 of the input data image.

Figure 11:
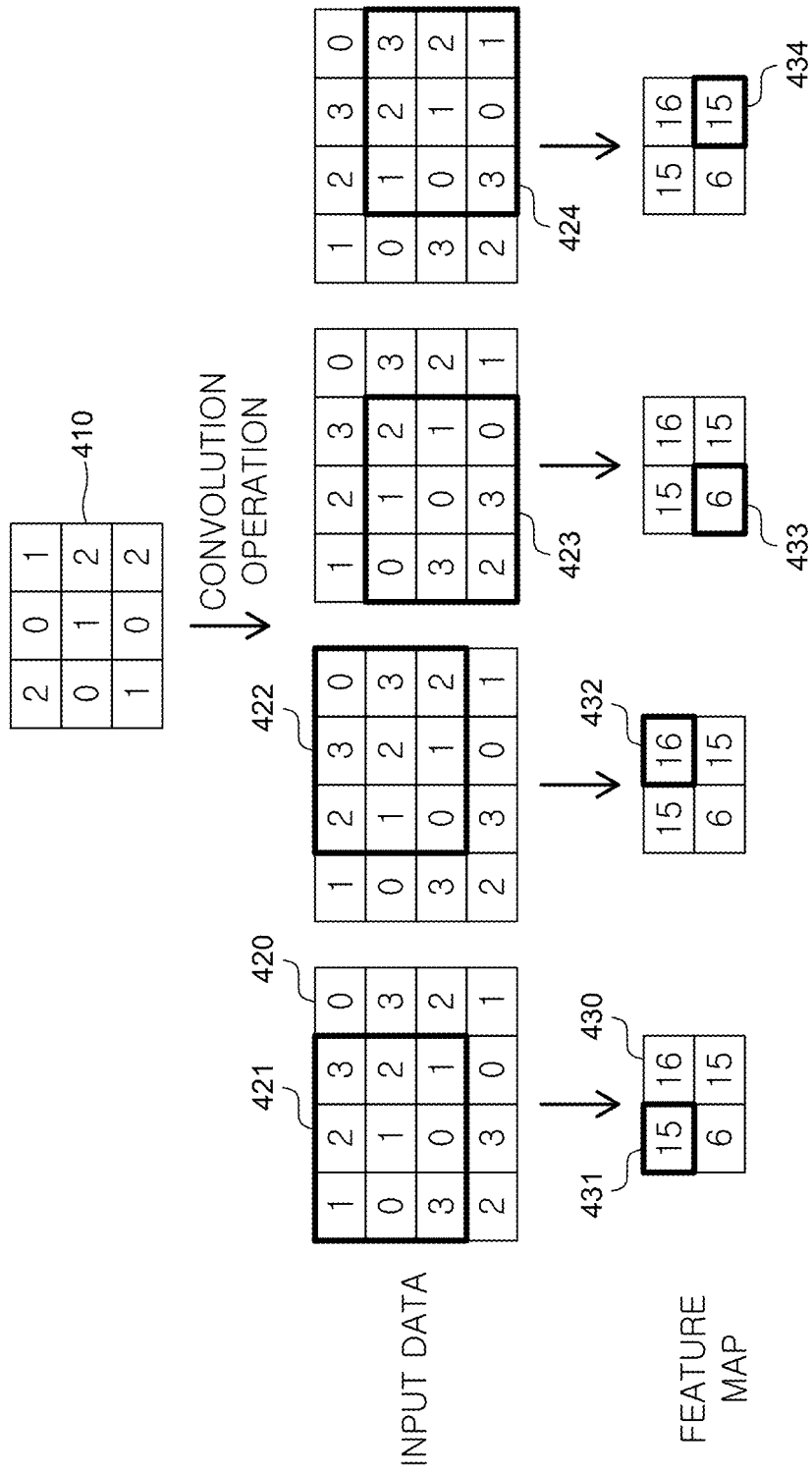
FIG. 11 is a diagram for explaining the operation of a convolutional neural network that generates a feature map using the kernel of FIG. 10.

FIG. 11 is a diagram for explaining the operation of a convolutional neural network that generates a feature map using the kernel of FIG. 10.

Referring to FIG. 11, the kernel 410 may traverse input data 420 at designated intervals and perform convolution, thereby finally generating a feature map 430. When the kernel 410 is applied to a part of the input data 420, the convolution may be performed by multiplying the input data values at a specific position of the part and the values at the corresponding position of the kernel 410, respectively, and then adding all the generated values.

Through this convolution process, calculated values of feature maps are generated, and whenever the kernel 410 traverses the input data 420, these convolution result values are generated to configure the feature map 430.

Each component value of the feature map may be converted into an activation map 430 through an activation function of a convolution layer.

In FIG. 11, the input data 420 input to the convolution layer is displayed as a two-dimensional matrix having a size of 4×4, and the kernel 410 is displayed as a two-dimensional matrix having a size of 3×3. However, the sizes of the input data 420 and the kernel 410 of the convolution layer are not limited thereto, and may be variously changed according to the performance and requirements of the convolution neural network including the convolution layer.

As shown, when the input data 420 is input to the convolution layer, the kernel 410 traverses the input data 420 at predetermined intervals (e.g., stride=1), and a MAC operation may be performed to multiply the input data 420 and values at the same location of the kernel 410 and add the respective values.

Specifically, the kernel 410 assigns the MAC operation value "15" calculated at the specific position 421 of the input data 420 to the corresponding element 431 of the feature map 430. The kernel 410 assigns the MAC operation value "16" calculated at the next position 422 of the input data 420 to the corresponding element 432 of the feature map 430. The kernel 410 assigns the MAC operation value "6" calculated at the next position 423 of the input data 420 to the corresponding element 433 of the feature map 430. Next, the kernel 410 allocates the MAC operation value "15" calculated at the next position 424 of the input data 420 to the corresponding element 434 of the feature map 430.

In this way, if the kernel 410 traverses the input data 420 and assigns all MAC calculation values to the feature map 430, the feature map 430 having a size of 2×2 can be completed.

At this time, if the input data 510 is composed of, for example, three channels (R channel, G channel, B channel), a feature map for each channel may be generated through convolution in which the same kernel or different channels for each channel traverse the data for each channel of the input data 420 and perform multiple multiplication and sum.

For the MAC operation, the scheduler 130 allocates processing elements PE1 to PE12 to perform each MAC operation based on a predetermined operation sequence, and a memory address where MAC operation values are stored may be set in the NPU internal memory 120 in consideration of a scheduling sequence.

Figure 12:
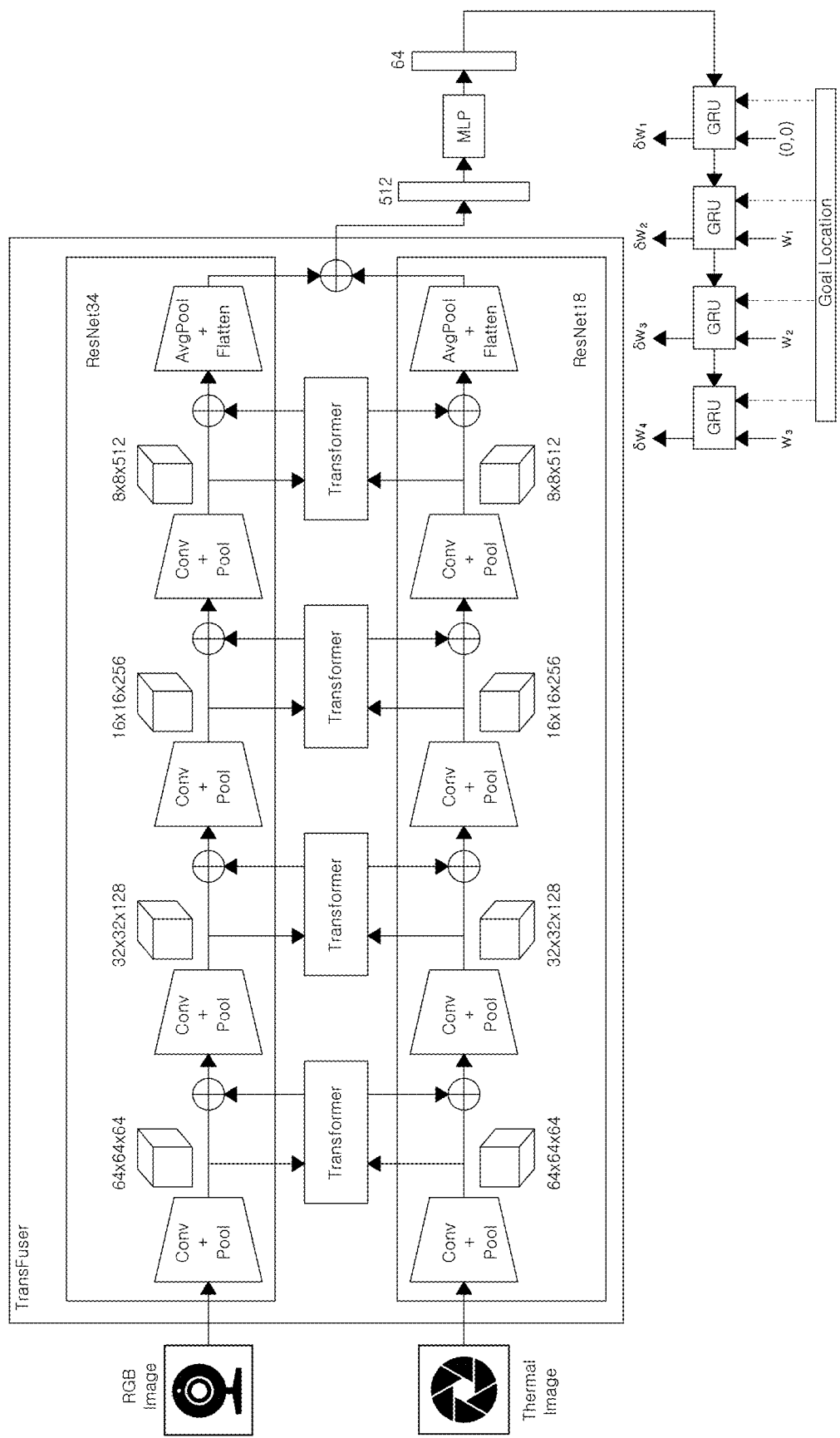
FIG. 12 is a conceptual diagram illustrating an image fusion artificial neural network model according to an example of the present disclosure.

FIG. 12 illustrates an image fusion artificial neural network model according to an example of the present disclosure.

Referring to FIG. 12, an example of processing signals provided from an RGB camera and a thermal image sensor through parallel processing is illustrated. During parallel processing, different information can be exchanged through transformers. The method may be a deep fusion method of FIG. 14 to be described later.

Meanwhile, although not shown, the artificial neural network may include a concatenation operation and a skip-connection operation in order to process different data provided from heterogeneous sensors. The concatenation operation means to combine the output results of a specific layer with each other, and the skip-connection operation means to pass the output result of a specific layer to another layer while skipping subsequent layers.

Such a concatenation operation and a skip-connection operation may increase control difficulty and usage of the internal memory 120 of the NPU 100.

So far, artificial neural networks for fusion and processing of different data provided from heterogeneous sensors have been described, but there is a weakness in that the performance of artificial neural networks cannot be improved through the above description only. Accordingly, the optimized artificial neural network and NPU structure will be described below.

Fusion Artificial Neural Network and NPU Structure Optimized to Process Different Data from Heterogeneous Sensors First, the inventor(s) of the present disclosure studied NPUs for processing different data from heterogeneous sensors.

In the design of the NPU, the following configuration should be considered:
i. It is necessary to have an NPU structure suitable for heterogeneous data signal processing (e.g., RGB camera+thermal image sensor).
ii. NPU memory control suitable for heterogeneous input signal processing (e.g., RGB camera+thermal image sensor) is required.
iii. It is necessary to have an NPU structure suitable for multiple input channels.
iv. NPU memory control suitable for multiple input channels is required.
v. It is necessary to have an NPU structure suitable for image fusion artificial neural network model (fusion artificial neural network model) calculation.
vi. A processing speed of less than 16 ms is required for real-time application.
vii. It is necessary to achieve low power consumption for battery operation.

An NPU for implementing an image fusion artificial neural network model (fusion artificial neural network model) should support the following functions. Expected requirements include:
i. CNN function support: must be able to control PE array and memory optimized for convolution.
ii. It should be able to efficiently handle depth wise-separable convolutions. It should have a structure that improves PE utilization and performance.
iii. Batch mode function support: memory configuration is required to process multiple channels (cameras 1 to 6) and heterogeneous sensors at the same time. (PE array size and memory size must be in an appropriate ratio)
iv. Concatenation function support: the NPU for image fusion artificial neural network model (fusion artificial neural network model) must be able to process heterogeneous input data signals with concatenation function.
v. Skip-connection function support: NPU for image fusion artificial neural network model (fusion artificial neural network model) may include special function unit (SFU) that can provide skip function.
vi. Support for deep learning image preprocessing function: the NPU for image fusion artificial neural network model (fusion artificial neural network model) should be able to provide the function of pre-processing different data signals.
vii. A compiler capable of efficiently compiling an image fusion artificial neural network model (fusion artificial neural network model) should be provided.

In one embodiment of the present disclosure, the NPU 100 having the following characteristics is proposed.
i. The NPU 100 may process a machine code for analyzing locality information of ANN data of an image fusion artificial neural network model (fusion artificial neural network model) such as late fusion, early fusion, and deep fusion.
ii. The NPU 100 may be configured to control the PE array to process heterogeneous sensor data based on an artificial neural network data locality control unit (ADC). That is, the image fusion artificial neural network model (fusion artificial neural network model) is fused into various structures according to the sensor, and PE utilization rate can be improved by providing the NPU 100 corresponding to the structure.
iii. It may be configured to appropriately set the size of the on-chip memory 120 to process heterogeneous sensor data based on ANN data locality information. That is, the memory bandwidth of the NPU 100 processing the fusion artificial neural network can be improved by analyzing the artificial neural network data locality information of the image fusion artificial neural network model (fusion artificial neural network model).
iv. The NPU 100 may include a special function unit (SFU) capable of efficiently processing bilinear interpolation, concatenation, and skip-connection required in an image fusion artificial neural network model.

Figure 13:
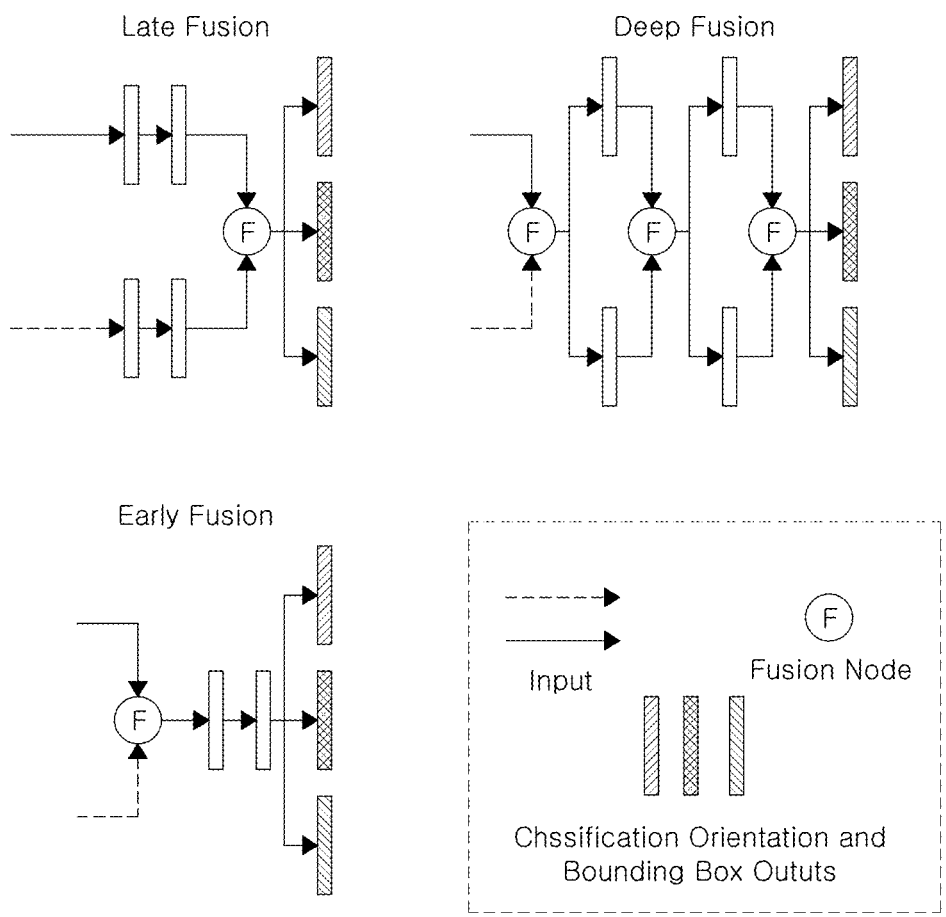
FIG. 13 is an exemplary diagram illustrating a fusion method of an NPU according to an example of the present disclosure.

FIG. 13 illustrates a fusion method of an NPU according to an example of the present disclosure.

Referring to FIG. 13, "F" refers to fusion operation, and each block refers to each layer. The NPU 100 may perform late fusion, early fusion, and deep fusion. Late fusion means performing calculations for each layer and then fusion of the calculation results in the final process. Early fusion means performing operations on each layer after fusion of different data at an early stage. Deep fusion means performing calculations in different layers after fusion of different data, performing calculations for each layer after fusion of calculation results again. In the present disclosure, through an early fusion operation, two different images may be merged at the beginning of an operation of a plurality of layers, and an operation of a subsequent layer may be performed. Alternatively, through late fusion, operations may be performed for each layer assigned to two different images, and then, after merging the operation results, operations on a subsequent layer may be performed. For example, the two different images may be an image obtained through a visible ray image sensor and an image obtained through a thermal image sensor, but are not limited thereto.

Hereinafter, the structure of the NPU 100 capable of disclosing the above features will be described.

Figure 14:
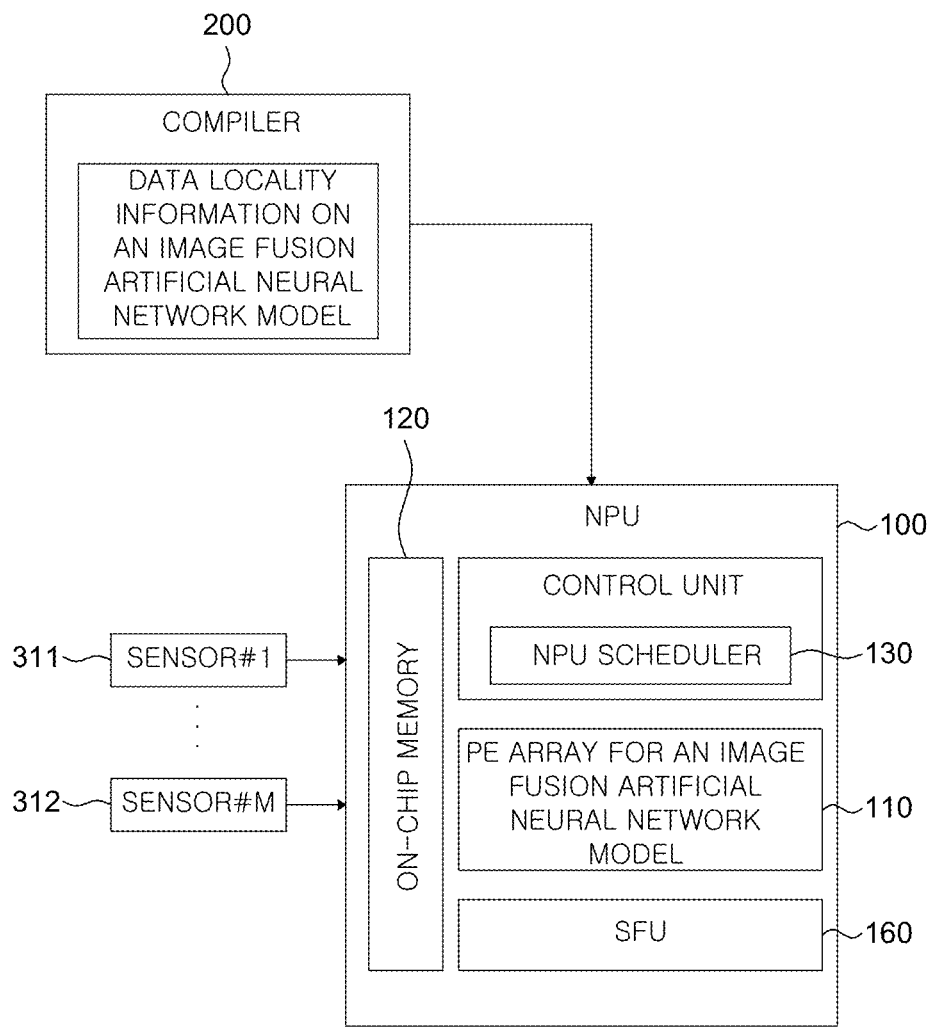
FIG. 14 is a conceptual diagram illustrating a system including an exemplary NPU architecture according to a first example of the present disclosure.

FIG. 14 illustrates a system including an exemplary NPU architecture according to a first example of the present disclosure.

Referring to FIG. 14, the NPU 100 may include a PE array 110 for an image fusion artificial neural network model, an on-chip memory 120, an NPU scheduler 130, and a special function unit (SFU) 160. In describing FIG. 14, redundant descriptions may be omitted for convenience of explanation.

The PE array 110 for the image fusion artificial neural network model may refer to a PE array 110 configured to process convolution of a multi-layered image fusion artificial neural network model having at least one fusion layer. That is, the fusion layer may be configured to output a feature map in which data from different types of sensors are fused. More specifically, the SFU 160 of the NPU 100 may be a circuit configured to receive sensor data from multiple sensors and provide a function of fusion of each sensor input data. The PE array 110 for the image fusion artificial neural network model may be configured to receive fusion data from the SFU 160 and process convolution.

The NPU 100 may receive different data from the M heterogeneous sensors 311 and 312. The heterogeneous sensors may include image sensors having different image characteristics and resolutions.

The NPU 100 may obtain artificial neural network data locality information of an image fusion artificial neural network model (fusion artificial neural network (ANN)) from the compiler 200.

At least one layer of the image fusion artificial neural network model may be a layer in which input data of a plurality of sensors are fused.

The NPU 100 may be configured to provide a concatenation function to at least one layer for fusion of heterogeneous sensor input data. Each feature map of the heterogeneous sensors of the concatenated layer may be processed to have the same size as at least one axis in order to be concatenated with each other. For example, in order to connect heterogeneous sensor data on the X-axis, the X-axis size of each of the heterogeneous sensor data may be the same. For example, in order to concatenate heterogeneous sensor data on the Y-axis, the Y-axis size of each of the heterogeneous sensor data may be the same. For example, in order to concatenate the heterogeneous sensor data in the Z-axis, the size of the Z-axis of each of the heterogeneous sensor data may be the same. In order to improve the processing efficiency of the NPU 100, the size of one of the heterogeneous sensor data may be scaled up or scaled down. Accordingly, it is also possible that the sizes of one axis of the fused data of heterogeneous sensor data are the same. In other words, since the processing element array 100 is in the form of an N×M matrix, the PE utilization rate of the processing element array 100 may vary according to the size of at least one axis of sensor data.

In order to receive and process different data from the heterogeneous sensors 311 and 312, the NPU scheduler 130 may process inference of an image fusion artificial neural network model (fusion artificial neural network model).

The NPU scheduler 130 may be included in the control unit as shown.

The NPU scheduler 130 acquires and analyzes artificial neural network data locality information of an image fusion artificial neural network model (fusion artificial neural network) from the compiler 200, and controls the operation of the on-chip memory 120. In more detail, the process is as follows.

The compiler 200 may generate artificial neural network data locality information of a fusion artificial neural network to be processed by the NPU 100.

The NPU scheduler 130 may generate a list of special functions required for the image fusion artificial neural network model (fusion artificial neural network). The special function may mean various functions required for artificial neural network operations other than convolution.

It is possible to efficiently control increased memory access problems that often occur in fusion artificial neural networks, such as non-maximum suppression (NMS), SKIP-CONNECTION, Bottleneck, and Bilinear interpolation by using the artificial neural network data locality information of the image fusion artificial neural network model (fusion artificial neural network).

In the compilation step, the size and storage period of data (e.g., the first output feature map) to be stored until the first output feature map information calculated earlier and the second output feature map information processed later are fused, can be known by using the artificial neural network data locality information of the image fusion artificial neural network model (fusion artificial neural network). Accordingly, a memory map for the on-chip memory 120 can be efficiently set in advance.

The SFU 160 may perform skip-connection and concatenation necessary for an image fusion artificial neural network model (fusion artificial neural network). To elaborate, concatenation can be used to fuse heterogeneous sensor data. For concatenation, the size of each sensor data may be readjusted. For example, the NPU 100 may be configured to process concatenation of fusion artificial neural network by providing functions such as resize and interpolation.

The on-chip memory 120 of the NPU 100 may selectively retain specific data according to the PE array 110 or the SFU 160 for a specific period of time. Whether or not to selectively preserve may be controlled by a control unit.

Also, the PE array 110 may be configured to have the number of threads corresponding to the number of heterogeneous sensors. That is, the array 110 of the NPU 100 configured to receive two sensor data may be configured to have two threads. That is, if one thread is composed of N×M processing elements, two threads may be composed of N×M×2 processing elements. For example, each thread of the PE array 110 may be configured to process feature maps of each heterogeneous sensor. A plurality of threads of an NPU may be referred to as a multi-core of the NPU.

The NPU 100 may output an operation result of the image fusion artificial neural network model through an output unit.

The NPU architecture according to the above-described first example may be variously modified.

Figure 15A:
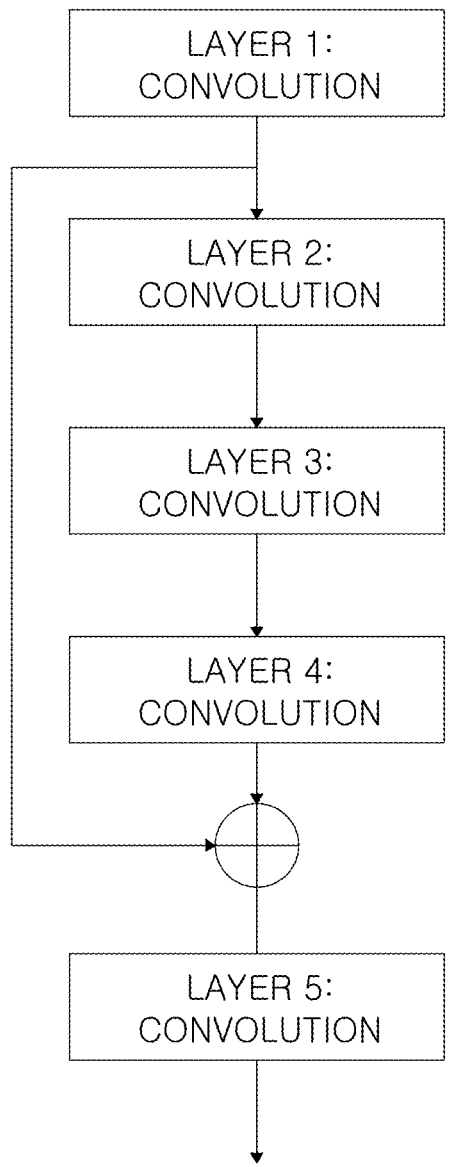
FIG. 15A is an exemplary diagram for explaining skip-connection included in the image fusion artificial neural network model according to the first example of the present disclosure.

FIG. 15A shows a skip-connection included in an image fusion artificial neural network model according to the first example of the present disclosure, and FIG. 15B shows locality information of artificial neural network data of the image fusion artificial neural network model of FIG. 15A.

Referring to FIG. 15A, in order to compute five layers including skip-connection operation, the compiler 200 as shown in FIG. 14 may generate artificial neural network data locality information of an image fusion artificial neural network model having a sequence of 16 steps, for example.

The NPU 100 requests data operations from the on-chip memory 120 in the order of artificial neural network data locality information of the image fusion artificial neural network model.

In the case of a skip-connection operation, the output feature map (OFMAP) of the first layer may be added to the output feature map (OFMAP) of the fourth layer.

For such a skip-connection operation, the output feature map of the first layer must be preserved until the fifth layer operation. However, other data may be deleted after operation to utilize memory space.

In the deleted memory area, data to be calculated later based on the order of artificial neural network data locality information of the image fusion artificial neural network model may be stored. Therefore, necessary data may be sequentially brought into the on-chip memory 120 according to the order of artificial neural network data locality information of the image fusion artificial neural network model, and data not reused may be deleted. As such, even if the memory size of the on-chip memory 120 is small, the operating efficiency of the on-chip memory 120 can be improved.

Accordingly, the NPU 100 may selectively preserve or delete specific data of the on-chip memory 120 for a certain period of time based on the artificial neural network data locality information of the image fusion artificial neural network model.

Such mechanism may be applied to various operations such as concatenation, non-maximum suppression (NMS), and bilinear interpolation as well as skip-connection operation.

For example, for efficient control of the on-chip memory 120, after the NPU 100 performs the convolution operation of the second layer, data of the first layer excluding the output feature map (OFMAP) of the first layer may be deleted. For another example, for efficient control of the on-chip memory 120, after the NPU 100 performs the convolution operation of the third layer, data of the second layer excluding the output feature map (OFMAP) of the first layer may be deleted. For another example, for efficient control of the on-chip memory 120, after the NPU 100 performs the convolution operation of the fourth layer, data of the third layer excluding the output feature map (OFMAP) of the first layer may be deleted. For another example, for efficient control of the on-chip memory 120, after the NPU 100 performs the convolution operation of the fifth layer, data of the fourth layer excluding the output feature map (OFMAP) of the first layer may be deleted.

The artificial neural network data locality information of the image fusion artificial neural network model refers to a data processing sequence generated by the compiler 200 and performed by the NPU 100 in consideration of the conditions listed below.

1. Structure of ANN model (fusion artificial neural networks such as Resnet, YOLO, SSD, and the like designed to receive heterogeneous sensor data).
2. The structure of the processor (e.g., architecture of CPU, GPU, NPU, and the like).

In the case of the NPU 100, the number of PEs, the structure of the PEs (e.g., input stationary, output stationary, weight stationary, and the like), SFU structure configured to operate organically with the PE array, and the like.

3. On-chip memory 120 size (e.g., when cache is smaller than data, tiling algorithm needs to be applied, and the like).
4. Data size of each layer of the image fusion artificial neural network model to be processed.
5. Processing Policy. That is, the NPU 100 determines the order of requesting to read the input feature map (IFMAP) first or request to read the kernel first. This may vary depending on the processor or compiler 200.

Figure 16:
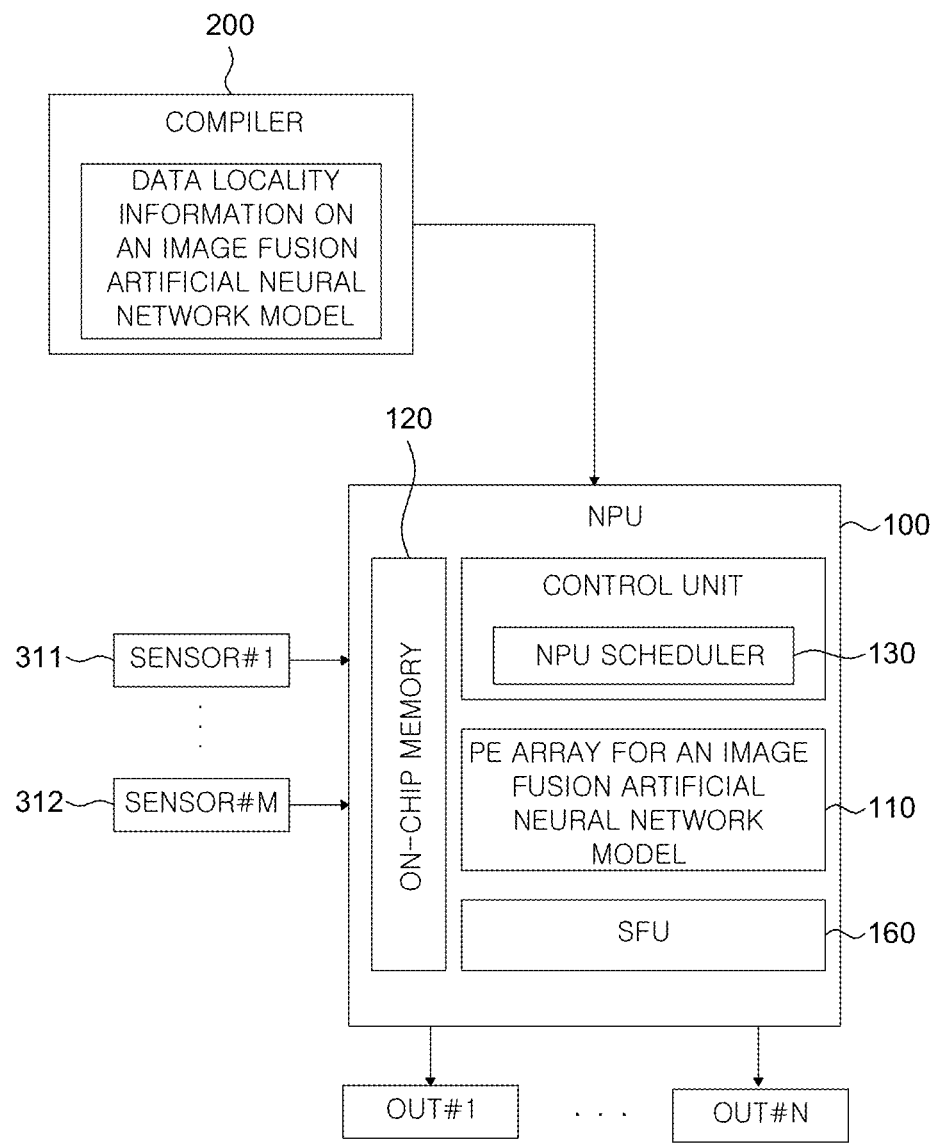
FIG. 16 is a conceptual diagram illustrating a system including an exemplary NPU architecture according to a second example of the present disclosure.

FIG. 16 illustrates a system including an exemplary NPU architecture according to a second example of the present disclosure.

Referring to FIG. 16, the NPU 100 may include a PE array 110, an on-chip memory 120, an NPU scheduler 130, and a special function unit (SFU) 160 for an image fusion artificial neural network model. In describing FIG. 16, redundant descriptions may be omitted for convenience of description.

The NPU scheduler 130 may be included in the control unit as shown.

The NPU 100 may receive different data from the M heterogeneous sensors 311 and 312. The heterogeneous sensors may include a microphone, a touch screen, a camera, an altimeter, a barometer, an optical blood flow measurement sensor, an electrocardiogram measurement sensor, an inertial measurement sensor, a geo-positioning system, an optical sensor, a thermometer, an electromyograph, an electrode measurement device, and the like.

The NPU 100 may obtain artificial neural network data locality information of an image fusion artificial neural network model from the compiler 200.

The NPU 100 may output N results (e.g., heterogeneous inference results) through N output units. The heterogeneous data output from the NPU 100 may include image fusion, classification, semantic segmentation, object detection, and prediction.

Figure 17:
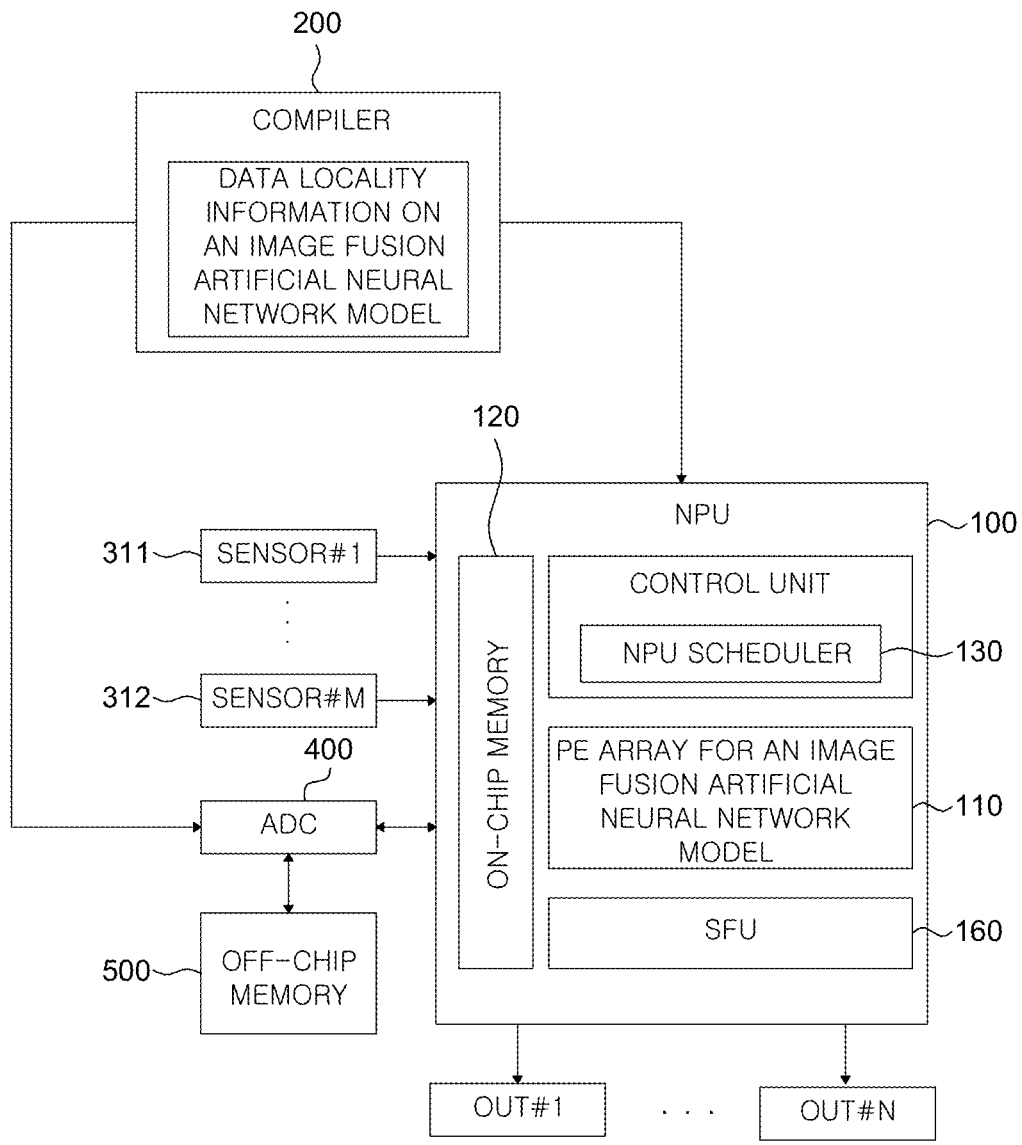
FIG. 17 is a conceptual diagram illustrating a system including an exemplary NPU architecture according to a third example of the present disclosure.

FIG. 17 illustrates a system including an exemplary NPU architecture according to a third example of the present disclosure.

Referring to FIG. 17, the NPU 100 may include a PE array 110, an on-chip memory 120, an NPU scheduler 130, and a special function unit (SFU) 160 for an image fusion artificial neural network model. In describing FIG. 17, redundant descriptions may be omitted for convenience of explanation.

The NPU scheduler 130 may be included in the control unit as shown.

The NPU 100 may receive different data from the M heterogeneous sensors 311 and 312. The heterogeneous sensors may include image sensors having different image characteristics and resolutions.

The NPU 100 may acquire artificial neural network data locality information of an image fusion artificial neural network model from the compiler 200.

The NPU 100 may receive data required for operation of an image fusion artificial neural network model from the off-chip memory 500 through an artificial neural network data locality control unit (ADC) 400.

The ADC 400 may prefetch data from an off-chip memory to an on-chip memory based on the artificial neural network data locality information of the image fusion artificial neural network model provided from the compiler 200.

Specifically, the ADC 400 may control the operation of the off-chip memory 500 by receiving and analyzing artificial neural network data locality information of an image fusion artificial neural network model from the compiler 200 or receives analyzed information from the compiler 200.

The ADC 400 may read the data stored in the off-chip memory 500 according to the artificial neural network data locality information of the image fusion artificial neural network model and cache it in the on-chip memory in advance. The off-chip memory 500 may store all weight kernels of the image fusion artificial neural network model and the on-chip memory 120 may store only at least some weight kernels necessary according to the artificial neural network data locality information of the image fusion artificial neural network model among all the weight kernels stored in the off-chip memory 500. The memory capacity of the off-chip memory 500 may be greater than that of the on-chip memory 120.

The ADC 400 may prepare data necessary for the NPU 100 in advance from the off-chip memory 500 independently or in conjunction with the NPU 100 based on the artificial neural network data locality information of the image fusion artificial neural network model. Therefore, the latency of the inference operation of the NPU 100 may be reduced or the operation speed may be improved.

The NPU 100 may output N results (e.g., heterogeneous inference results) through N outputs.

Figure 18:
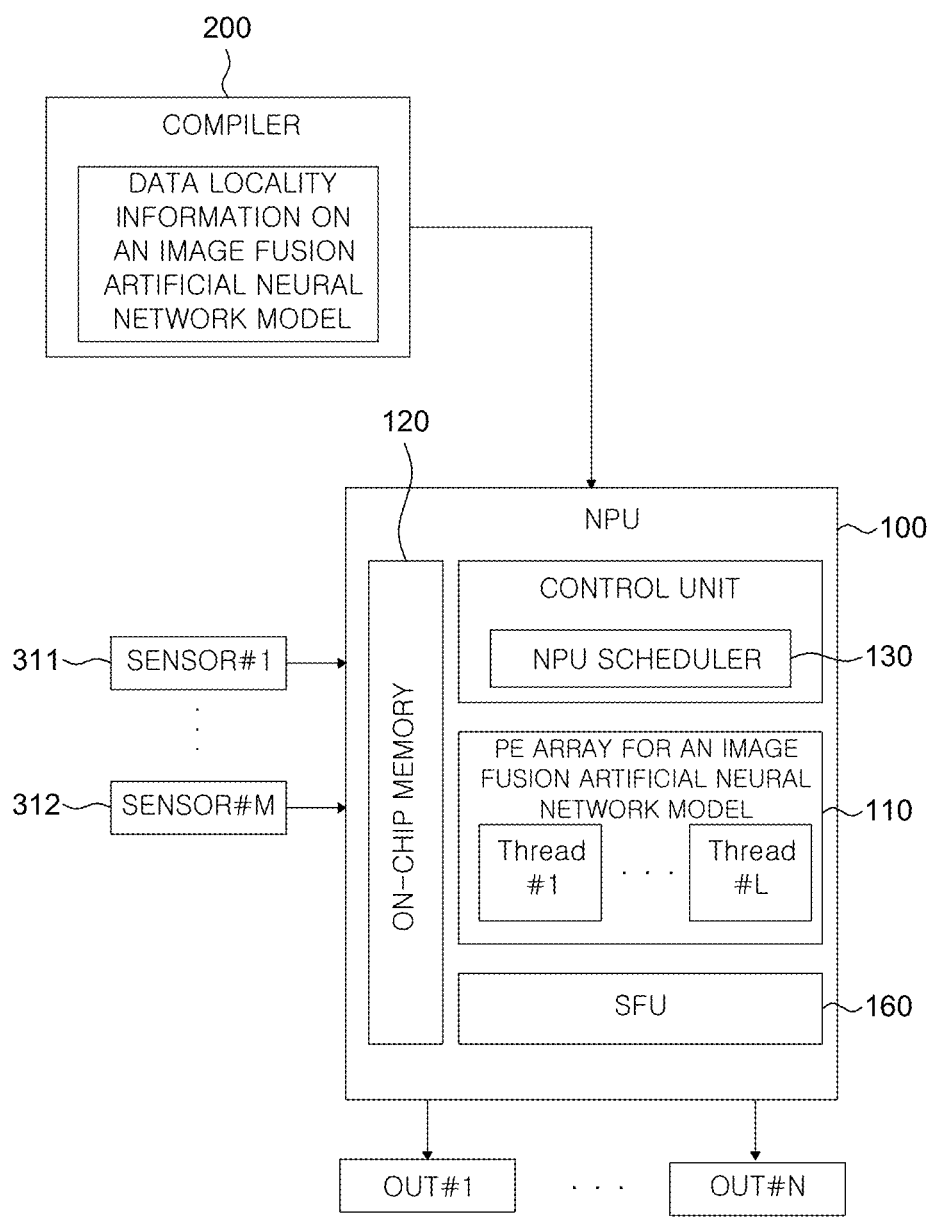
FIG. 18 is a conceptual diagram illustrating a system including an exemplary NPU architecture according to a fourth example of the present disclosure.
Figure 19:
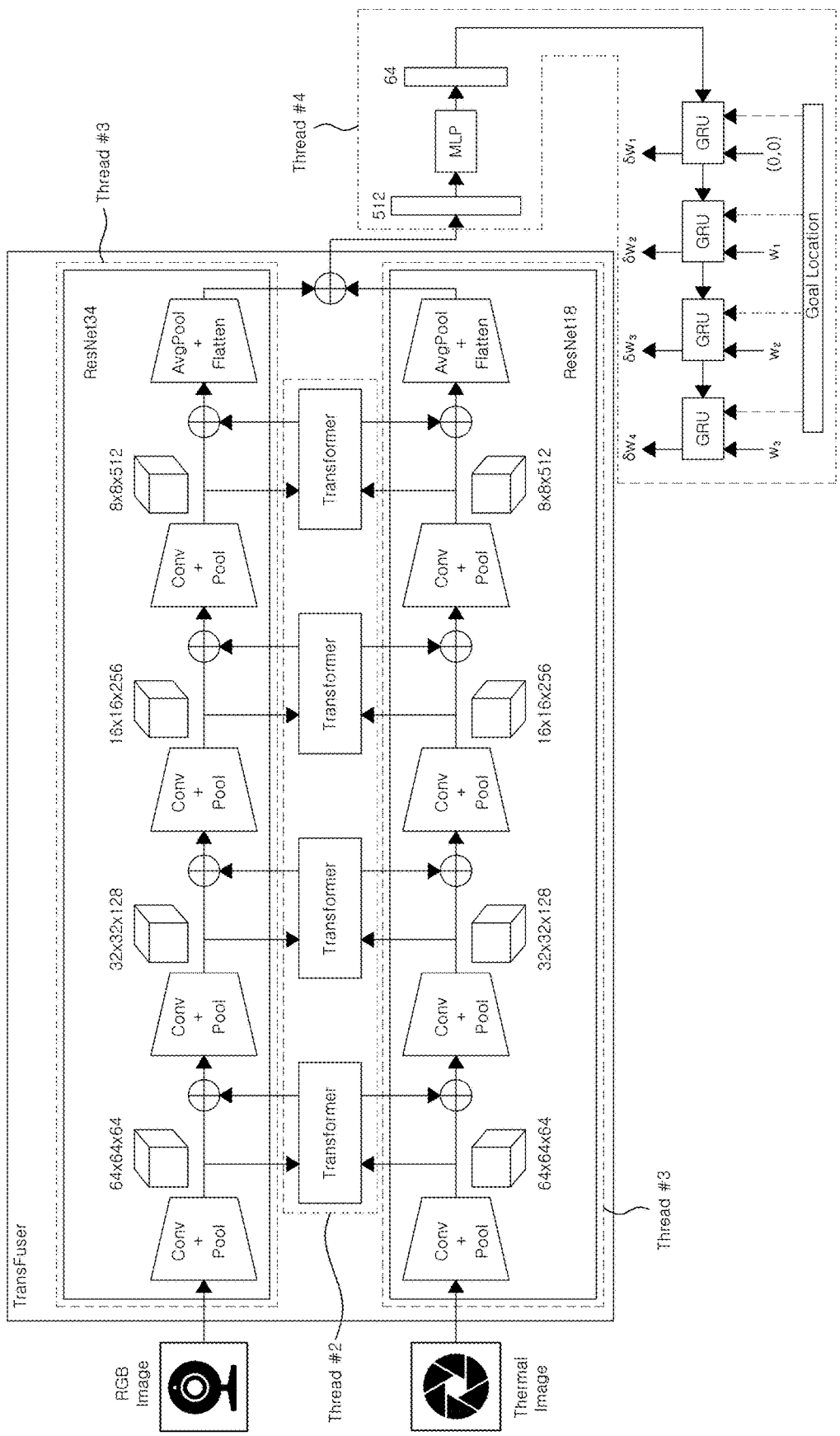
FIG. 19 is an exemplary diagram illustrating an example in which the image fusion artificial neural network model of FIG. 12 is divided into threads according to the fourth example of FIG. 18.

FIG. 18 illustrates a system including an exemplary NPU architecture according to a fourth example of the present disclosure, and FIG. 19 exemplifies the image fusion artificial neural network model of FIG. 12 being divided into threads according to the fourth example of FIG. 18.

Referring to FIG. 18, the NPU 100 may include a PE array 110, an on-chip memory 120, an NPU scheduler 130, and a special function unit (SFU) 160 for an image fusion artificial neural network model.

The NPU scheduler 130 may be included in the control unit as shown.

The NPU 100 may receive different data from the M heterogeneous sensors 311 and 312. The heterogeneous sensors may include image sensors having different image characteristics and resolutions.

The NPU 100 may obtain artificial neural network data locality information of an image fusion artificial neural network model from the compiler 200.

The NPU 100 may output N heterogeneous data (e.g., heterogeneous inference results). The heterogeneous data output from the NPU 100 may include image fusion, classification, semantic segmentation, object detection, and prediction.

The PE array 110 can process multiple threads. As shown in FIG. 19, RGB image data obtained from the camera can be processed through thread #1, transformer model processing can be processed through thread #2, and data obtained from the thermal image sensor can be processed through thread #3. Multiple threads of the PE array 110 may be referred to as a multi-core of the NPU. That is, each thread may refer to an independent PE array.

To this end, the compiler 200 may analyze the image fusion artificial neural network model and classify threads based on a parallel operation flow.

The PE array 110 of the NPU 100 can improve computation efficiency through multiple threads of a layer capable of parallel processing computation of an image fusion artificial neural network model.

Each thread may be configured to include the same or different numbers of processing elements.

The NPU 100 may control each thread in the PE array 110 to communicate with the on-chip memory 120.

The NPU 100 may selectively allocate an internal space of the on-chip memory 120 for each thread.

The NPU 100 may allocate an appropriate on-chip memory 120 for each thread. Memory allocation of the off-chip memory 120 may be determined by a control unit based on artificial neural network data locality information of an image fusion artificial neural network model.

The NPU 100 may set a thread in the PE array 110 based on a fusion artificial neural network.

The NPU 100 may output N results (e.g., heterogeneous inference results) through N outputs.

Figure 20:
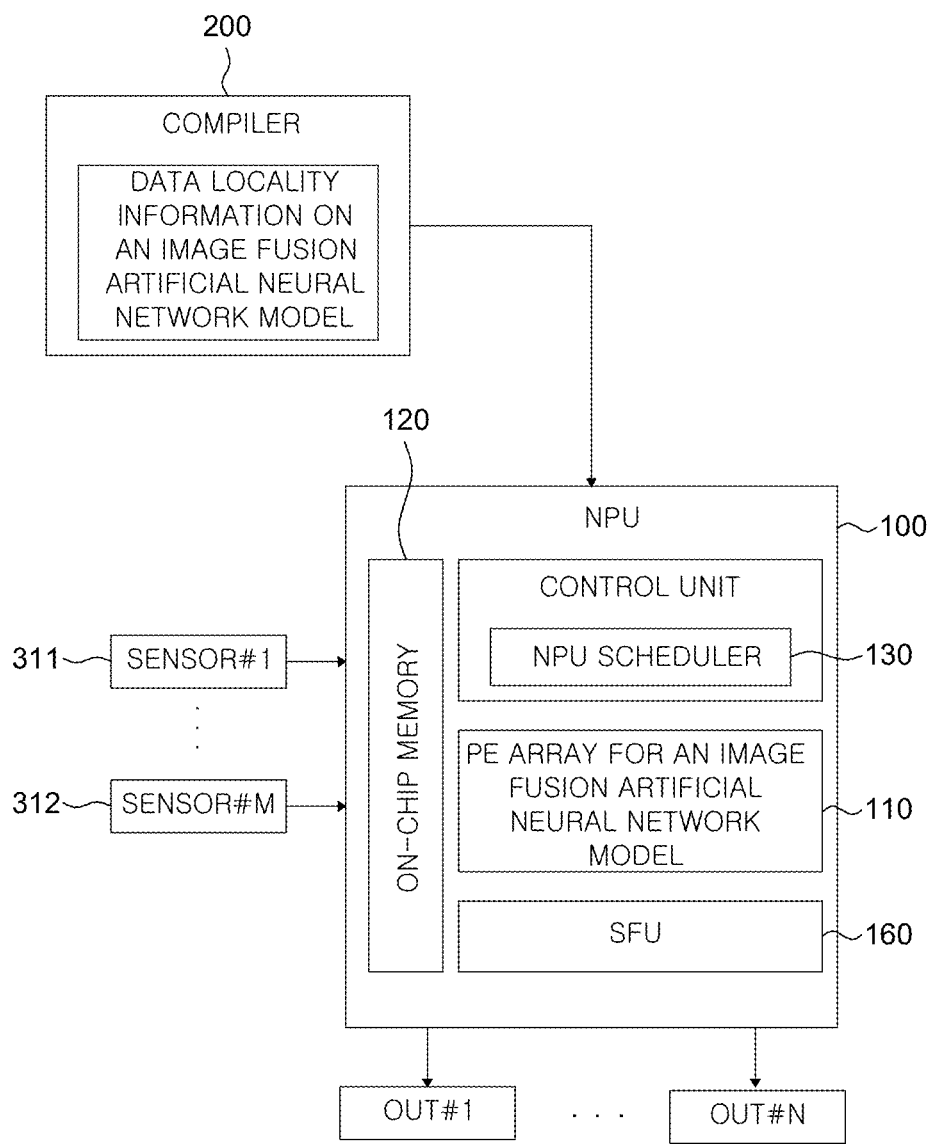
FIG. 20 is a conceptual diagram illustrating a system including an exemplary NPU architecture according to a fifth example of the present disclosure.
Figure 21:
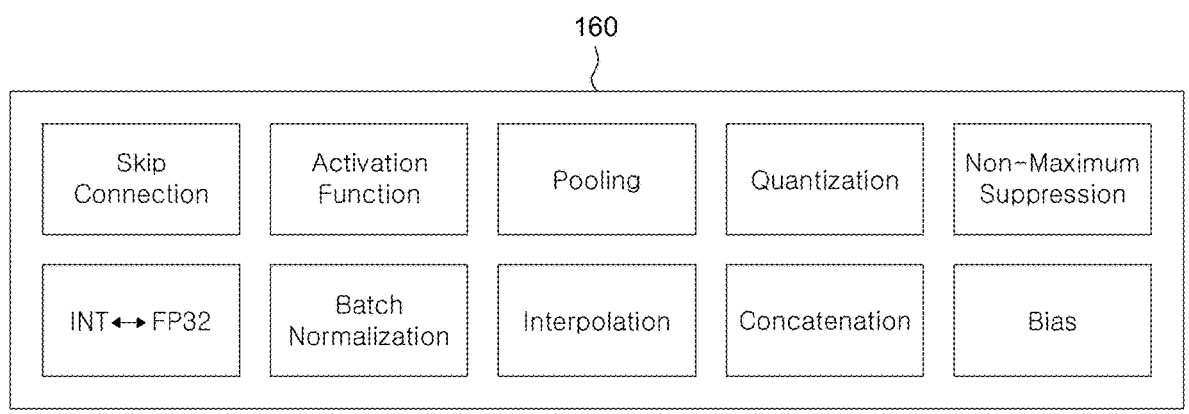
FIG. 21 is an exemplary diagram illustrating of an example of a pipeline structure of the SFU of FIG. 20.

FIG. 20 illustrates a system including an exemplary NPU architecture according to a fifth example of the present disclosure, and FIG. 21 illustrates an example of a pipeline structure of the SFU of FIG. 20.

Referring to FIG. 20, the NPU 100 may include a PE array 110, an on-chip memory 120, an NPU scheduler 130, and a special function unit (SFU) 160 for an image fusion artificial neural network model.

The NPU 100 may receive different data from the M heterogeneous sensors 311 and 312. The heterogeneous sensors may include image sensors having different image characteristics and resolutions.

The NPU 100 may obtain artificial neural network data locality information of an image fusion artificial neural network model (fusion artificial neural network (ANN)) from the compiler 200.

The NPU 100 may output N heterogeneous data (e.g., heterogeneous inference results). The heterogeneous data output from the NPU 100 may include image fusion, classification, semantic segmentation, object detection, and prediction.

As shown in FIG. 21, the SFU 160 includes several functional units. Each functional unit can be operated selectively. Each functional unit can be selectively turned-on or turned-off. That is, each functional unit can be set.

The processing element array may refer to circuitry configured to perform a main operation of an image fusion artificial neural network model. The main operation may refer to convolution or matrix multiplication. That is, the main operation may refer to most operations in an artificial neural network (ANN) (e.g., a fusion artificial neural network).

A special function unit (SFU) may refer to a set of a plurality of special function circuits configured to selectively perform a special function operation of an image fusion artificial neural network model. That is, the special function unit (SFU) may additionally calculate a special function, and the special function operation may refer to an additional operation in various artificial neural networks (ANNs) (e.g., a fusion artificial neural network).

The amount of calculation of the main operation of the image fusion artificial neural network model may be relatively greater than the amount of calculation of the special function calculation.

In other words, the SFU 160 may include various functional units required for inferencing of an image fusion artificial neural network model.

For example, the functional units of the SFU 160 may include a functional unit for skip-connection operation, a functional unit for activating an activation function, a functional unit for pooling operation, a functional units for quantization operations, a functional unit for non-maximum suppression (NMS) operation, a functional units for integer to floating point conversion (INT to FP32) operation, a functional unit for batch-normalization operation, a functional unit for interpolation operation, a functional unit for concatenation operation, a functional unit for bias operation and the like.

Functional units of the SFU 160 may be selectively turned-on or turned-off according to artificial neural network data locality information of an image fusion artificial neural network model. To elaborate, the type of special function operations required by each layer of the image fusion artificial neural network model may be different for each layer. The artificial neural network data locality information included in the machine code may include control information related to turn-on or turn-off of a corresponding functional unit when an operation for a specific layer is performed.

Figure 22A:
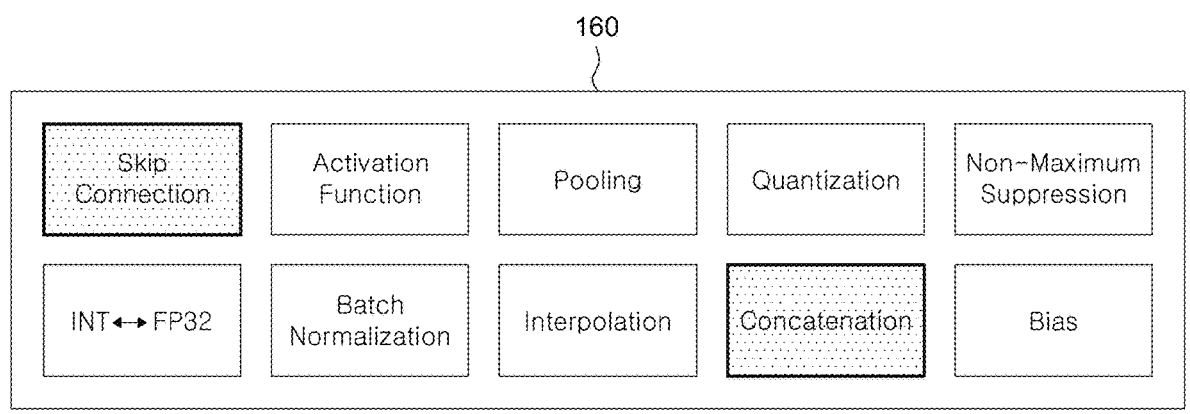
FIG. 22A is an exemplary diagram illustrating an example of the SFU of FIG. 20.
Figure 22B:
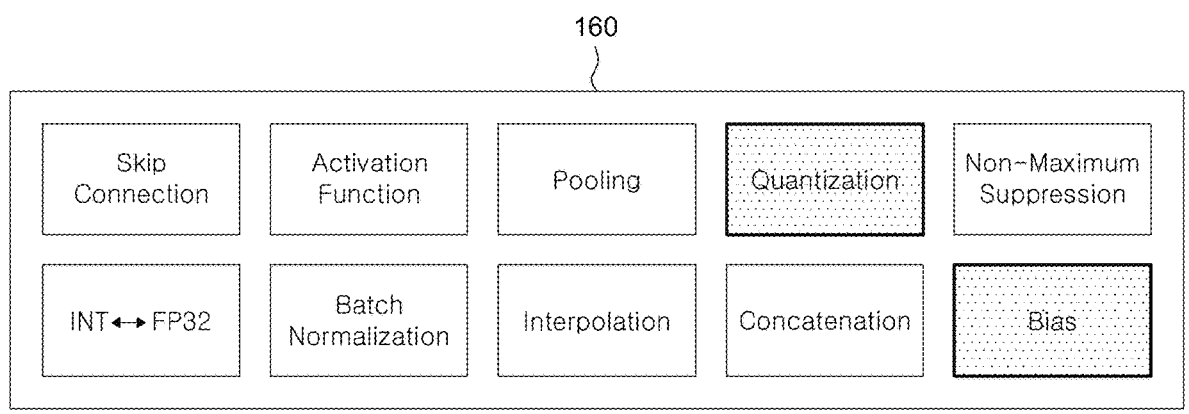
FIG. 22B is an exemplary diagram illustrating another example of the SFU of FIG. 20.

FIG. 22A illustrates an example of the SFU of FIG. 20, and FIG. 22B illustrates another example of the SFU of FIG. 20.

Referring to FIGS. 22A and 22B, activated units among functional units of the SFU 160 may be turned-on.

Specifically, as shown in FIG. 22A, the SFU 160 may selectively activate a skip-connection operation and a concatenation operation. For example, each activated functional unit may be expressed with hatching.

For example, the SFU 160 may concatenate heterogeneous sensor data for a fusion operation. For example, for the skip-connection operation of the SFU 160, the control unit may control the on-chip memory 120 and the SFU 160.

Specifically, as shown in FIG. 22B, a quantization operation and a bias operation may be selectively activated. For example, in order to reduce the size of feature map data output from the PE array 110, the quantization function unit of the SFU 160 may receive the feature map output from the PE array 110 and quantize the feature map to a specific bit width. The quantized feature map may be stored in the on-chip memory 120. A series of operations may be performed sequentially through the control unit, and the NPU scheduler 130 may be configured to control the sequence of operations.

In this way, when some functional units of the SFU 160 are selectively turned-off, power consumption of the NPU 100 can be reduced. Meanwhile, in order to turn-off some functional units, power-gating may be used. Alternatively, clock-gating may be performed to turn-off some functional units.

Figure 23:
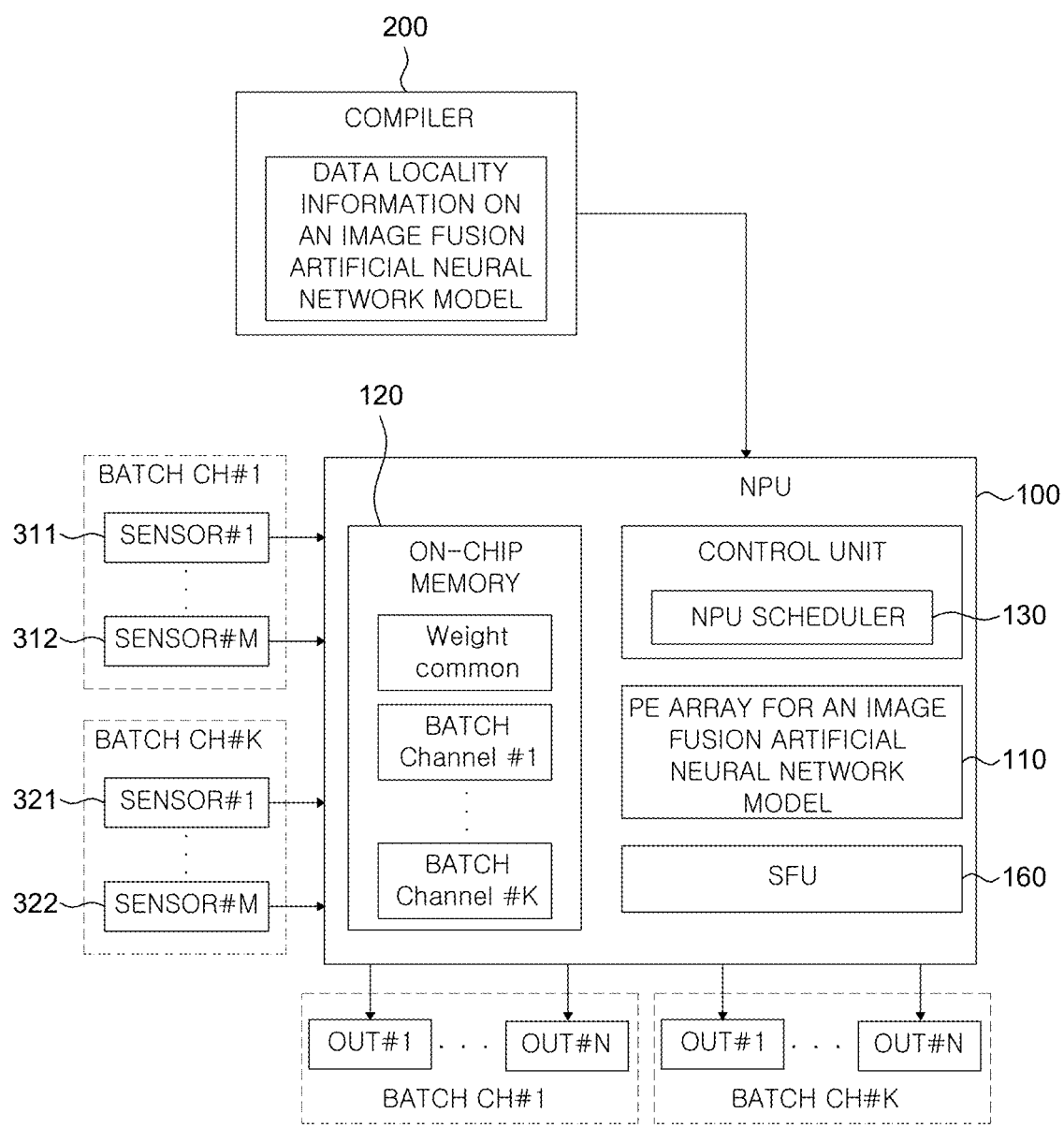
FIG. 23 is a conceptual diagram illustrating a system including an NPU architecture as an example according to a sixth example of the present disclosure.

FIG. 23 illustrates a system including an exemplary NPU architecture according to a sixth example of the present disclosure.

Referring to FIG. 23, NPU batch mode may be applied. The NPU 100 to which batch mode is applied may include a PE array 110, an on-chip memory 120, an NPU scheduler 130, and a special function unit (SFU) 160 for an image fusion artificial neural network model.

The NPU scheduler 130 may be included in the control unit as shown.

The NPU 100 may obtain artificial neural network data locality information of an image fusion artificial neural network model from the compiler 200.

The batch mode disclosed in this example may refer to a mode configured to achieve low-power consumption by sequentially processing a plurality of identical sensors with one image fusion artificial neural network model and reusing weights of the one image fusion artificial neural network model by the number of the plurality of identical sensors.

For the batch mode operation, the control unit of the NPU 100 may be configured to control the NPU scheduler 130 so that the weights stored in the on-chip memory are reused as many as the number of sensors input to each batch channel. That is, illustratively, the NPU 100 may be configured to operate in batch mode with M sensors. At this time, the batch mode operation of the NPU 100 may be configured to operate as an image fusion artificial neural network model.

For the operation of the image fusion artificial neural network model, the NPU 100 may be configured to have a plurality of batch channels (BATCH CH #1, BATCH CH #2) for fusion. Each batch channel may be configured to include a plurality of identical sensors. The first batch channel (BATCH CH #1) may include a plurality of first sensors. At this time, the number of first sensors may be M. The Kth batch channel (BATCH CH #K) may be composed of a plurality of second sensors. At this time, the number of second sensors may be M.

The NPU 100 reuses and processes corresponding weights in the on-chip memory 120 for inputs from the sensors 311 and 312 through the first batch channel, and the NPU 100 reuses and processes corresponding weights in the on-chip memory 120 for inputs from the sensors 321 and 322 through the second batch channel.

As such, the NPU 100 may receive inputs from various sensors through a plurality of batch channels, reuse weights, and process an image fusion artificial neural network model in batch mode. A sensor of at least one channel among the plurality of batch channels may be different from a sensor of at least one other channel.

The on-chip memory 120 in the NPU 100 may be configured to have a storage space corresponding to a plurality of batch channels.

The NPU scheduler 130 in the NPU 100 may operate the PE array 110 according to a batch mode.

The SFU 160 in the NPU 100 may provide a special function for processing at least one fusion operation.

The NPU 100 may transfer each output through a plurality of batch channels.

At least one of the plurality of batch channels may be inference data of an image fusion artificial neural network model network.

Figure 24:
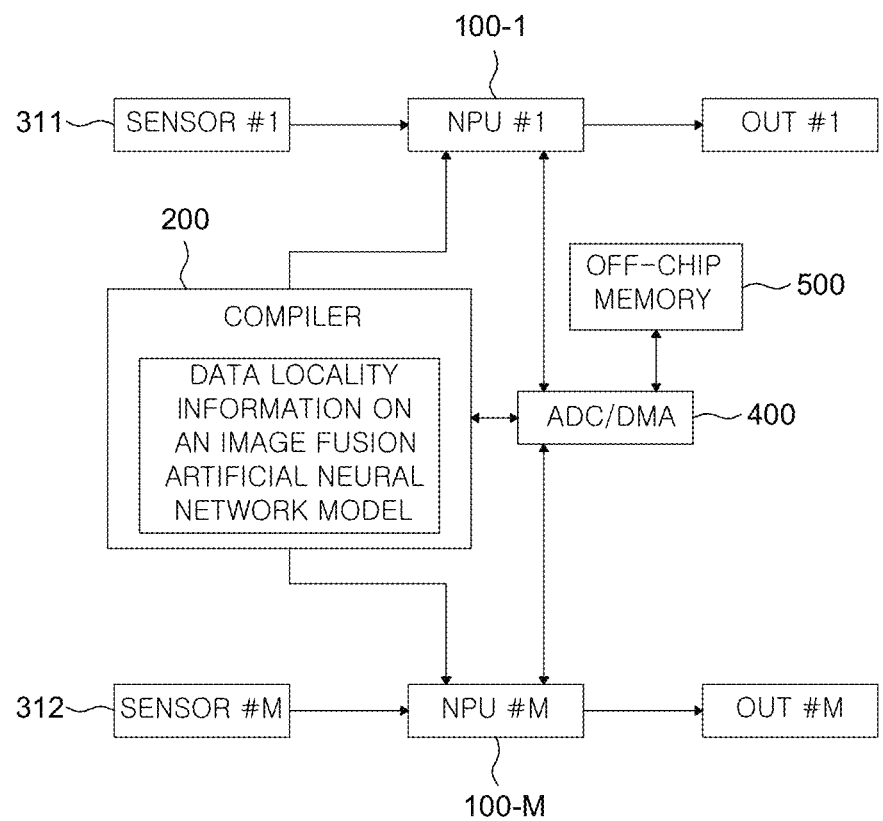
FIG. 24 is an exemplary diagram illustrating an example of utilizing a plurality of NPUs according to a seventh example of the present disclosure.
Figure 25:
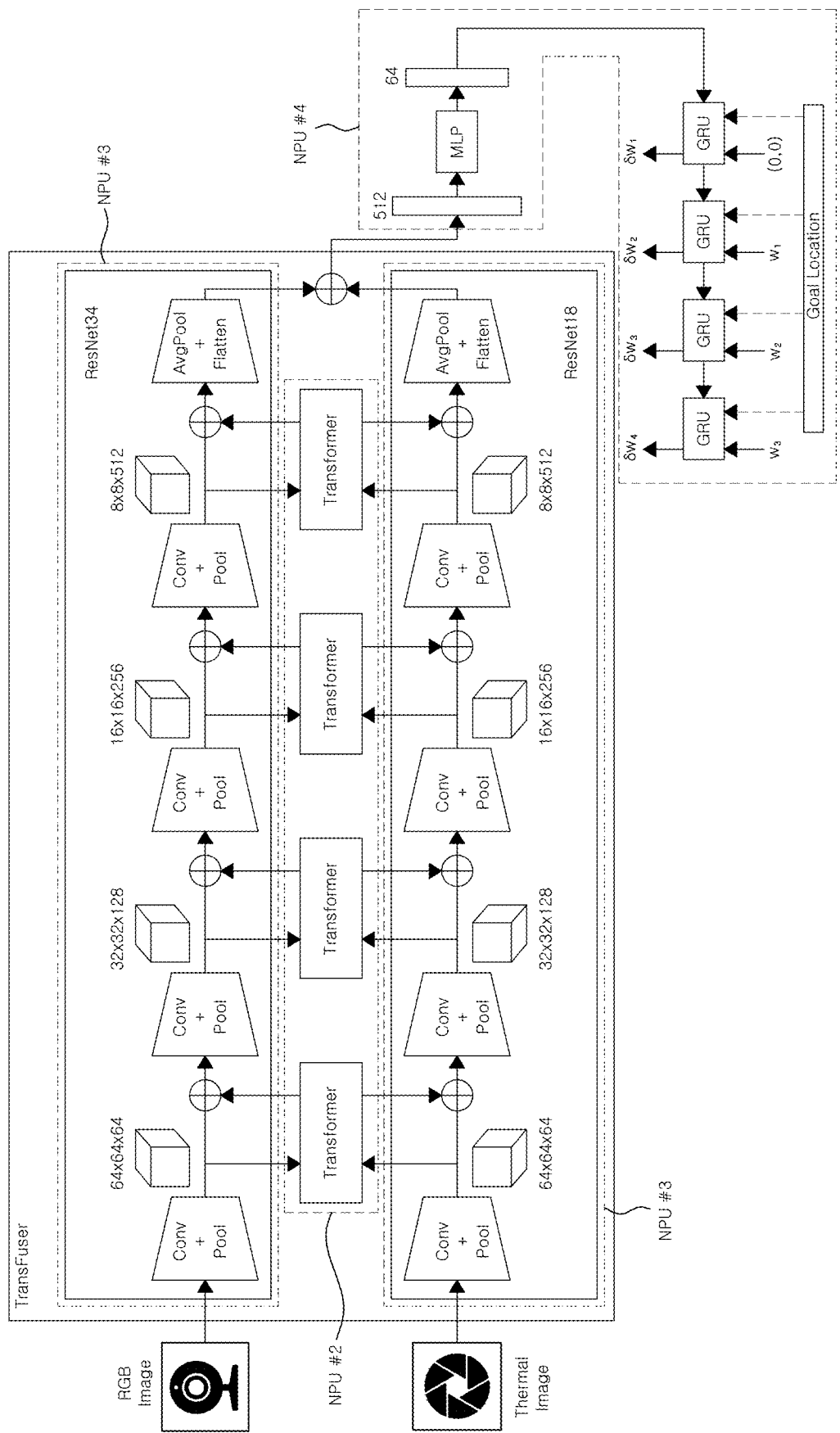
FIG. 25 is an exemplary diagram illustrating an example of processing the fusion artificial neural network of FIG. 12 through the plurality of NPUs of FIG. 24.

FIG. 24 illustrates an example of utilizing a plurality of NPUs according to a seventh example of the present disclosure, and FIG. 25 illustrates an example of processing the fusion artificial neural network of FIG. 12 through the plurality of NPUs of FIG. 24.

Referring to FIG. 24, illustratively, a plurality of M NPUs may be used to generate a fusion image. Among the M NPUs, the first NPU 100-1 may process data provided from, for example, sensor #1 311, and the Mth NPU 100-M may process data provided from sensor #M 312, for example. The plurality of NPUs (e.g., 100-1 and 100-2) may access the off-chip memory 500 through ADC/DMA (Direct Memory Access) 400.

The plurality of NPUs (e.g., 100-1 and 100-2) may obtain artificial neural network data locality information of an image fusion artificial neural network model from the compiler 200.

Each NPU may process an image fusion artificial neural network model and transfer an operation for fusion to different NPUs through the ADC/DMA 400.

The ADC/DMA 400 may obtain data locality information for an artificial neural network of a fusion image fusion artificial neural network model from the compiler 200.

The compiler 200 may generate artificial neural network data locality information by dividing it into data locality information #1 and data locality information #M, so that operations to be processed in parallel among operations according to the artificial neural network data locality information of the image fusion artificial neural network model can be processed in each NPU.

The off-chip memory 500 may store data that can be shared by a plurality of NPUs and transfer it to each NPU.

Referring to FIG. 25, NPU #1 may be in charge of the first artificial neural network for processing data provided from the camera, and NPU #2 may be in charge of the second artificial neural network to process the data provided from the thermal image sensor. In addition, the NPU #2 may be in charge of conversion for fusion between the first artificial neural network and the second artificial neural network.

So far, the NPU 100 for an image fusion artificial neural network model according to various examples of the present disclosure has been described. According to the present disclosure, a high-resolution thermal image may be generated by using a high-resolution general visible light image sensor and a low-resolution thermal image sensor built into a general device, not a professional device. Accordingly, the present disclosure can generate a high-resolution thermal image at low cost. In addition, for example, the present disclosure can improve the night vision of an image in a device owned by a user or a black box of a vehicle rather than in a device designed for night vision.

<Brief Summary of Disclosures of the Present Disclosure>

According to an example of the present disclosure, a neural processing unit for an image fusion artificial neural network model is provided. The neural processing unit for image fusion may comprise: a control unit configured to receive a machine code of an image fusion artificial neural network model trained to output a third image which is new, by inputting a first image and a second image having different resolutions and image characteristics; an input circuit configured to receive a plurality of input signals corresponding to the image fusion artificial neural network model; a processing element array configured to perform a main operation of the image fusion artificial neural network model; a special function unit circuit configured to perform special function operation of the image fusion artificial neural network model; and an on-chip memory configured to store data of the main operation and/or the special function operation of the image fusion artificial neural network model, wherein the control unit is configured to control the processing element array, the special function unit circuit, and the on-chip memory so that an operation order of the image fusion artificial neural network model is processed in a preset order according to a data locality information of the image fusion artificial neural network model included in the machine code, wherein a third resolution of the third image has a value between a first resolution of the first image and a second resolution of the second image, and wherein a third image characteristic of the third image is at least partially the same as a first image characteristic of the first image or a second image characteristic of the second image.

The first image may be an image obtained through a visible ray image sensor.

The second image may be an image obtained through a thermal image sensor.

The first image and the second image include different images with respect to one object, and the image characteristics may be determined by types of image sensors that acquire the first image and the second image.

The image fusion artificial neural network model may be an artificial neural network model configured to input only a portion of the first image and a portion of the second image corresponding to a face area in an object extracted from the first image and the second image.

The third image may be an image to which at least one characteristic that can be determined from the second image is applied to at least a portion of the first image.

The image fusion artificial neural network model is a model to which a weight is applied to emphasize at least one characteristic that can be determined from the first image and at least one characteristic that can be determined from the second image.

The image fusion artificial neural network model may be an artificial neural network model configured to input only RGB values of the first image or a brightness value of each pixel of the first image.

The third resolution of the third image may be the same as the first resolution of the first image.

The image fusion artificial neural network model may be trained based on a generative adversarial networks (GAN) structure, and corresponds to a generator configured to generate a new image by taking different images with respect to one object as inputs.

The image fusion artificial neural network model may be an artificial neural name model configured such that the generator and a discriminator verifying an image generated by the generator, configuring the GAN, compete with each other to update a weight for increasing the third resolution of the third image.

The image fusion artificial neural network model may be trained based on a training data set having a substantially similar format to the first image and the second image.

The processing element array may be configured to process a convolutional operation and an activation function operation.

The processing element array may be configured to process at least one operation of matrix multiplication, dilated convolution, transposed convolution, and bilinear interpolation for increasing the third resolution of the third image.

The neural processing unit may further comprise an output unit configured to output at least one inference operation result of the image fusion artificial neural network model trained to process the at least one inference operation among classification, semantic segmentation, object detection, pose estimation, and prediction by the processing element array.

The special function unit circuit may further comprise at least one function of skip-connection and concatenation for artificial neural network fusion.

The control unit may further comprise a scheduler and the scheduler may be configured to control the on-chip memory to preserve specific data stored in the on-chip memory until a specific operation step of the image fusion artificial neural network model based on the data locality information of the image fusion artificial neural network model.

The processing element array may further comprise a plurality of threads, and the control unit may be configured to control the plurality of threads to process parallel sections of the image fusion artificial neural network model based on data locality of the image fusion artificial neural network model.

According to another example of the present disclosure, a system for an image fusion artificial neural network model is provided. The artificial neural network system for image fusion includes a first sensor that acquires a first image having a first resolution and a first image characteristic; a second sensor that acquires a second image having a second resolution smaller than the first resolution and a second image characteristic different from the first image characteristic; and a neural processing unit configured to process an image fusion artificial neural network model trained to output a new third image by inputting a first image and a second image having different resolutions and image characteristics, wherein a third resolution of the third image has a value between the first resolution of the first image and the second resolution of the second image, and wherein a third image characteristic of the third image may be at least partially the same as the first image characteristic of the first image or the second image characteristic of the second image.

Although one example of the present disclosure has been described in more detail with reference to the accompanying drawings, the present disclosure is not necessarily limited to these examples, and may be variously modified and implemented without departing from the technical spirit of the present disclosure. Therefore, the examples disclosed in this disclosure are not intended to limit the technical spirit of the present disclosure, but to explain, and the scope of the technical spirit of the present disclosure is not limited by these examples. Therefore, the examples described above should be understood as illustrative in all respects and not limiting. The protection scope of the present disclosure should be construed by the claims below, and all technical ideas within the scope equivalent thereto should be construed as being included in the scope of the present disclosure.

[National research and development project supporting this invention]
[Assignment identification number] 1711175834
[Assignment number] R-20210401-010439
[Name of Department] Ministry of Science and ICT

[Task management (professional) institution name] National IT Industry Promotion Agency
[Research Project Name] Intensive Fostering of Innovative AI Semiconductor Companies
[Research Project Title] Compiler and Runtime for Artificial Neural Network Processor for Edge SW technology development
[Contribution rate] 1/1
[Name of project performing organization] DeepX Co., Ltd.
[Research period] 2022.06.01~2022.12.3131.

What is claimed is:

1. A neural processing unit (NPU) for image fusion, the NPU comprising:
   a controller configured to control the NPU according to a machine code of an image fusion artificial neural network (ANN) model that receives each of a first image having a first resolution and a first image characteristic and a second image having a second resolution different from the first resolution and a second image characteristic different from the first image characteristic, the image fusion ANN model being trained to output a third image by inputting the first image and the second image;
   a processing element (PE) array that includes a plurality of processing elements and is configured to perform a main operation of the image fusion ANN model, each of the plurality of processing elements comprising a multiplier configured to receive a plurality of input signals corresponding to the image fusion ANN model;
   a special function unit (SFU) circuit configured to perform a special function operation of the image fusion ANN model, the SFU circuit including a circuit configured to receive heterogenous sensor data from multiple sensors, respectively, and provide a function of fusion of the received heterogenous sensor data to output fusion data to the PE array; and
   an on-chip memory configured to store data of at least one of the main operation and the special function operation of the image fusion ANN model,
   wherein the controller is further configured to control the PE array, the SFU circuit, and the on-chip memory so that an operation order of the image fusion ANN model is processed in a preset order according to data locality information of the image fusion ANN model included in the machine code,
   wherein the third image is new and has a third resolution having a value between the first resolution and the second resolution,
   wherein the third image has an image characteristic that is the same as at least one of the first image characteristic and the second image characteristic, and
   wherein the PE array comprises a plurality of threads corresponding to the number of heterogeneous sensors.

2. The NPU of claim 1, wherein the first image includes an image obtained through a visible ray image sensor.

3. The NPU of claim 1, wherein the second image includes an image obtained through a thermal image sensor.

4. The NPU of claim 1,
   wherein the first image and the second image include different images with respect to one object, and
   wherein the image characteristics of the first image and the second image are determined by types of image sensors that acquire the first image and the second image.

5. The NPU of claim 4, wherein the image fusion ANN model is configured to input only a portion of the first image and a portion of the second image corresponding to a face area in an object extracted from the first image and the second image.

6. The NPU of claim 1, wherein the third image includes an image to which at least one characteristic that can be determined from the second image is applied to at least a portion of the first image.

7. The NPU of claim 1, wherein the image fusion ANN model is configured to apply a weight to emphasize at least one characteristic that can be determined from the first image and at least one characteristic that can be determined from the second image.

8. The NPU of claim 1, wherein the image fusion ANN model is configured to input only RGB values of the first image or a brightness value of each pixel of the first image.

9. The NPU of claim 1, wherein the third resolution of the third image is the same as the first resolution of the first image.

10. The NPU of claim 1, wherein the image fusion ANN model is further trained based on a generative adversarial network (GAN) structure and corresponds to a generator configured to generate a new image by taking different images with respect to one object as inputs.

11. The NPU of claim 10,
    wherein the image fusion ANN model is configured such that the generator and a discriminator configuring the GAN compete with each other to update a weight for increasing the third resolution of the third image, and
    wherein the discriminator is further configured to verify an image generated by the generator.

12. The NPU of claim 1, wherein the image fusion ANN model is further trained based on a training data set having a format substantially similar to that of the first image and the second image.

13. The NPU of claim 1, wherein the PE array is further configured to process a convolutional operation and an activation function operation.

14. The NPU of claim 1, wherein the PE array is further configured to process at least one operation of matrix multiplication, dilated convolution, transposed convolution, and bilinear interpolation for increasing the third resolution of the third image.

15. The NPU of claim 1,
    wherein the image fusion ANN model is configured to output a result of at least one inference operation among classification, semantic segmentation, object detection, pose estimation, and prediction by the PE array, and
    wherein the image fusion ANN model is further trained to process the at least one inference operation.

16. The NPU of claim 1, wherein the SFU circuit comprises at least one function of skip-connection and concatenation for artificial neural network fusion.

17. The NPU of claim 1, wherein the controller is further configured to control the on-chip memory to preserve specific data stored in the on-chip memory until a specific operation step of the image fusion ANN model based on the data locality information of the image fusion ANN model.

18. The NPU of claim 1,
    wherein the controller is further configured to control the plurality of threads of the PE array to process parallel sections of the image fusion ANN model based on the data locality information of the image fusion ANN model.

19. The NPU of claim 1, wherein the second resolution is less than the first resolution.

20. The NPU of claim 1, wherein the first image comprises an image obtained through a visible ray image sensor, and the second image comprises an image obtained through a thermal image sensor.

21. The NPU of claim 1, wherein the plurality of processing elements comprises N×M processing elements for each thread of the plurality of threads, each thread processing the heterogenous sensor data from one of the multiple sensors in parallel with the heterogenous sensor data from another of the multiple sensors.

* * * * *